US012334009B2

(12) United States Patent
Huang et al.

(10) Patent No.: US 12,334,009 B2
(45) Date of Patent: Jun. 17, 2025

(54) DISPLAY PANEL, ELECTRONIC DEVICE, AND DISPLAY DRIVING METHOD

(71) Applicant: Xiamen Tianma Display Technology Co., Ltd., Xiamen (CN)

(72) Inventors: Yantao Huang, Xiamen (CN); Ying Sun, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 17 days.

(21) Appl. No.: 18/098,587

(22) Filed: Jan. 18, 2023

(65) Prior Publication Data

US 2024/0071303 A1 Feb. 29, 2024

(30) Foreign Application Priority Data

Aug. 24, 2022 (CN) ........................ 202211023955.X

(51) Int. Cl.
*G09G 3/3233* (2016.01)

(52) U.S. Cl.
CPC ... *G09G 3/3233* (2013.01); *G09G 2300/0842* (2013.01); *G09G 2310/08* (2013.01); *G09G 2320/0247* (2013.01); *G09G 2320/045* (2013.01); *G09G 2330/021* (2013.01)

(58) Field of Classification Search
CPC ......... G09G 3/3233; G09G 2300/0842; G09G 2310/08; G09G 2320/0247; G09G 2320/045; G09G 2330/021; G09G 2300/0819; G09G 2300/0861; G09G 2310/0251; G09G 3/3208; G09G 3/32
See application file for complete search history.

(56) References Cited

U.S. PATENT DOCUMENTS

2016/0042707 A1* 2/2016 Wang .................. G09G 3/3266
345/214
2022/0335872 A1* 10/2022 Zhang ...................... G09G 3/20
2023/0026979 A1* 1/2023 Kwon .................... G09G 3/035

* cited by examiner

*Primary Examiner* — Abhishek Sarma
(74) *Attorney, Agent, or Firm* — Anova Law Group, PLLC

(57) ABSTRACT

A display panel that includes a pixel circuit including a plurality of refresh modes, and at least two refresh modes for the pixel circuit to be at different refresh frequencies, different reset signals corresponding to different reset signals.

24 Claims, 11 Drawing Sheets

DISPLAY PANEL, ELECTRONIC DEVICE, AND DISPLAY DRIVING METHOD

CROSS-REFERENCE TO RELATED APPLICATIONS

This application claims the priority of Chinese Patent Application No. 202211023955.X, filed on Aug. 24, 2022, the content of which is incorporated herein by reference in its entirety.

TECHNICAL FIELD

The present disclosure relates to the technical field of electronic devices and, more specifically, to a display panel, an electronic device, and a display driving method.

BACKGROUND

With the continuous development of science and technology, more and more electronic devices with display function are being used in people's daily activities, which has brought great convenience to people's daily activities, and these electronic devices are becoming an indispensable and important tool for people.

The main component of an electronic device to realize the display function is the display panel. In order to reduce power consumption and meet user requirements for different display modes, pixel circuits in conventional display panels need to have refresh modes corresponding to different refresh frequencies. There is a need to improve the display effect of such display panels.

SUMMARY

One aspect of the present disclosure provides a display panel. The display panel includes a pixel circuit. The pixel circuit includes a plurality of refresh modes, and at least two different refresh modes allow the pixel circuit to be at different refresh frequencies. Different refresh frequencies correspond to different reset signals.

Another aspect of the present disclosure provides an electronic device. The electronic device includes a display panel that includes a pixel circuit. The pixel circuit includes a plurality of refresh modes, and at least two different refresh modes allow the pixel circuit to be at different refresh frequencies. Different refresh frequencies correspond to different reset signals.

Another aspect of the present disclosure provides a display driving method. The method includes determining a refresh mode of a pixel circuit, the pixel circuit being at different refresh frequencies in different refresh modes; and, based on the refresh mode, under a corresponding refresh frequency, controlling, by the pixel circuit, a light-emitting element to perform image display. There are at least two different refresh modes to allow the pixel circuit to be at different refresh frequencies, and the light-emitting element is controlled to display images based on different input reset signals.

It can be seen from the above description that in the display panel, the electronic device, and the display driving method provided by the embodiments of the present disclosure, the pixel circuit has multiple refresh modes, at least two different refresh modes allow the pixel circuit to be in different refresh frequencies, and different refresh frequencies correspond to different reset signals. In this way, the pixel circuit can reset the node voltage in the pixel circuit through an adapted reset signal at the refresh frequency, thereby improving the situation of flickering and unevenness of the display screen.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

The structure, proportion, and size shown in the drawings of the specification are only used to match the contents disclosed in the specification. Any modification of structure, change of proportional relationship, or adjustment of size should still fall within the scope of the embodiments disclosed in the present disclosure without affecting the efficacy and purpose of the present disclosure.

DETAILED DESCRIPTION OF THE EMBODIMENTS

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

An active light-emitting display panel does not need a backlight, instead, the active light-emitting display panel controls light-emitting elements through a pixel circuit to display images. In the embodiments of the present disclosure, the display panel may be an active light-emitting display panel.

At present, the popular active light-emitting display panels include OLED panels and micro-LED panels. OLED panels use OLED elements as light-emitting elements, and micro-LED panels use micro-LED elements as light-emitting elements. The micro-LED elements may be Min LEDs or micro-LEDs.

In order to reduce power consumption and meet user requirements for different display modes, the pixel circuit in the display panel needs to have refresh modes corresponding to different refresh frequencies. In a conventional display panel, when the pixel circuit needs to have refresh modes corresponding to different refresh frequencies, flickering and unevenness of the display screen can occur due to the fact that when the pixel circuit is at different refresh frequencies, the same reset signal is often used to reset the node voltage, which causes flickering and unevenness of the display screen of the display panel, especially during low refresh frequencies.

In view of the above, embodiments of the present disclosure provide a display panel, an electronic device, and a display driving method. The display panel includes a pixel circuit having a plurality of refresh modes, and at least two different refresh modes for the pixel circuit to be at different refresh frequencies, different refresh frequencies corresponding to different reset signals.

In the embodiments of the present disclosure, the pixel circuit can have multiple refresh modes, at least two different refresh modes allow the pixel circuit to be at different refresh frequencies, and different refresh frequencies correspond to different reset signals. In this way, the pixel circuit can reset the node voltage in the pixel circuit through an adapted reset signal at the refresh frequency, thereby improving the situation of flickering and unevenness of the display screen.

In order to make the objectives, features, and advantages of the present disclosure more clear, the present disclosure will be described in further detail below with reference to the accompanying drawings and specific embodiments.

Figure 1:
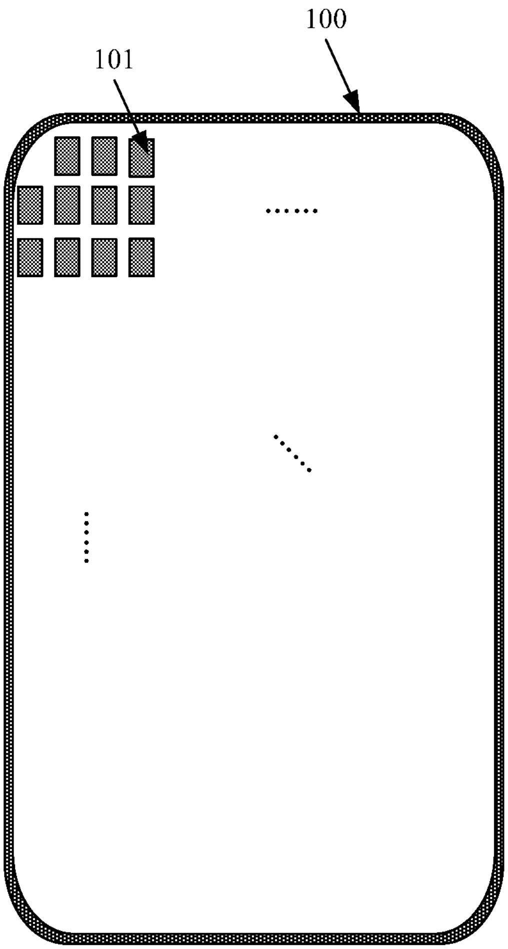
FIG. 1 is a schematic structural diagram of a display panel according to some embodiments of the present disclosure.
Figure 2:
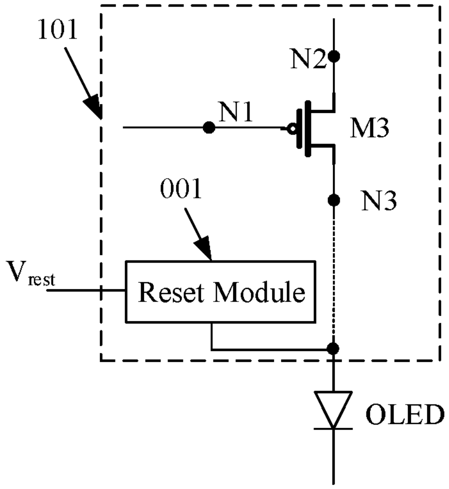
FIG. 2 is a schematic structural diagram of a pixel circuit in the display panel shown in FIG. 1.
Figure 3:
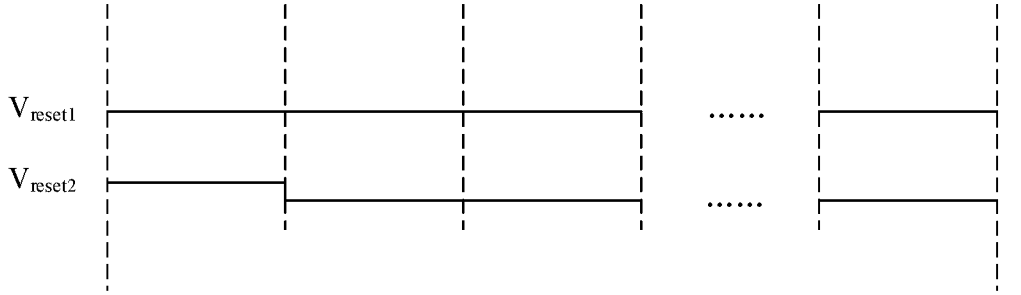
FIG. 3 is a timing diagram of a corresponding reset signal of the display panel shown in FIG. 1 under two different refresh frequencies.

Refer to FIG. 1 to FIG. 3. FIG. 1 is a schematic structural diagram of a display panel 100 according to some embodiments of the present disclosure, FIG. 2 is a schematic structural diagram of a pixel circuit in the display panel shown in FIG. 1, and FIG. 3 is a timing diagram of the corresponding reset signal of the pixel circuit in the display panel shown in FIG. 1 under two different refresh frequencies. The display panel 100 includes a pixel circuit 101 and a light-emitting element connected to the pixel circuit 101. In FIG. 2, the light-emitting element may be an OLED.

In the embodiments of the present disclosure, the pixel circuit 101 may have a plurality of refresh modes, and at least two different refresh modes may be provided, such that the pixel circuit 101 may be at different refresh frequencies, and different refresh frequencies may correspond to different reset signals $V_{reset}$.

In some embodiments, the pixel circuit 101 may include a drive transistor M3 and a reset module 001. The gate, first electrode, and second electrode of the driving transistor M3 may be connected to a first node N1, a second node N2, and a third node N3, respectively. In the light-emitting stage, the driving transistor M3 and the light-emitting element may be turned on, which can provide a driving current for the light-emitting element to control the light-emitting element to perform light-emitting display. Further, in the light-emitting stage, the driving current output by the driving transistor M3 may flow to the second electrode of the light-emitting element through the first electrode of the light-emitting element. In the embodiments of the present disclosure, the first electrode may be the anode of the light-emitting element and the second electrode may be the cathode of the light-emitting element.

The reset module 001 may be used for inputting the reset signal $V_{reset}$ to reset the node voltage of the pixel circuit 101. As shown in FIG. 2, the reset module 001 is connected to the first electrode of the light-emitting element as an example for illustration. At this time, the reset module 001 may perform a voltage reset on a node (i.e., the fourth node N4 hereinafter) that may be connected to the pixel circuit 101 and the first electrode.

In some embodiments, the reset module 001 may also be connected to the first node N1 for performing a voltage reset on the first node N1.

In some embodiments, the reset module 001 may also be connected to the second node N2 for performing a voltage reset on the second node N2.

It should be noted that, in some embodiments, the reset module 001 may also be electrically connected to the first node N1 and the second node N2.

The embodiments of the present disclosure take the rest module 001 resetting the voltage of the first electrode of the light-emitting element as an example for description. It should be noted that the reset module 001 may be used to reset the voltage of one or more of the first electrode of the light-emitting element, the first node N1, and the second node N2, and is not limited to being used to reset the voltage of the first electrode of the light-emitting element.

As shown in FIG. 2, the pixel circuit 101 has at least two different refresh modes, such that the pixel circuit 101 at different refresh frequencies may correspond to different reset voltages $V_{reset}$. For example, the pixel circuit 101 at one refresh frequency may be set to correspond to a first reset signal $V_{reset1}$, and the node voltage may be reset through the first reset signal $V_{reset1}$. In another example, the pixel circuit 101 at another refresh frequency may be set to correspond to a second reset signal $V_{reset2}$, and the node voltage may be reset through the first reset signal $V_{reset2}$. The first reset signal $V_{reset1}$ may be different from the second reset signal $V_{reset2}$.

In the embodiments of the present disclosure, the pixel circuit 101 may be set to have at least a first refresh mode and a second refresh mode. In the first refresh mode, the pixel circuit 101 may be at a first refresh frequency, and in the second refresh mode, the pixel circuit 101 may be at a second refresh frequency. In some embodiments, the pixel circuit 101 at the first refresh frequency and the pixel circuit 101 at the second refresh frequency may have different reset signals $V_{reset}$. As shown in FIG. 3, the pixel circuit 101 at the first refresh frequency can be set to correspond to a first reset signal $V_{reset1}$, and the pixel circuit 101 at the second refresh frequency can be set to correspond to a second reset signal $V_{reset2}$.

Since the pixel circuit 101 can have multiple refresh modes, in which at least two different refresh modes allow the pixel circuit 101 to be at different refresh frequencies, and different refresh frequencies correspond to different reset signals $V_{reset}$, by controlling the reset signal $V_{reset}$, the pixel circuit 101 may reset the node voltage in the pixel circuit 101 through the adapted reset signal $V_{reset}$ at the refresh frequency, thereby improving the flickering and unevenness of the display screen.

As described in the following embodiments, the pixel circuit 101 being at different refresh frequencies may include the pixel circuits 101 in the same sub-display area in the display panel 100 corresponding to different refresh frequencies at different screen refresh periods T, or the pixel circuits 101 in different sub-display areas being at different refresh frequencies respectively.

In some embodiments, having at least two refresh modes for the pixel circuit 101 to be at different refresh frequencies, and different refresh frequencies corresponding to different reset signal $V_{reset}$ may include: for two screen refresh periods T corresponding to different refresh frequencies, the reset signal $V_{reset}$ corresponding to a refresh frame in one screen refresh period T being different from the reset signal $V_{reset}$ corresponding to the refresh frame FR in another screen refresh period T, and/or the reset signal $V_{reset}$ corresponding to a holding frame FH in one screen refresh period T being different from the reset signal $V_{reset}$ corresponding to the holding frame FH in another screen refresh period T. In some embodiments, the difference in the reset signal $V_{reset}$ may include at least the difference in the magnitude of the reset signal $V_{reset}$.

Figure 4:
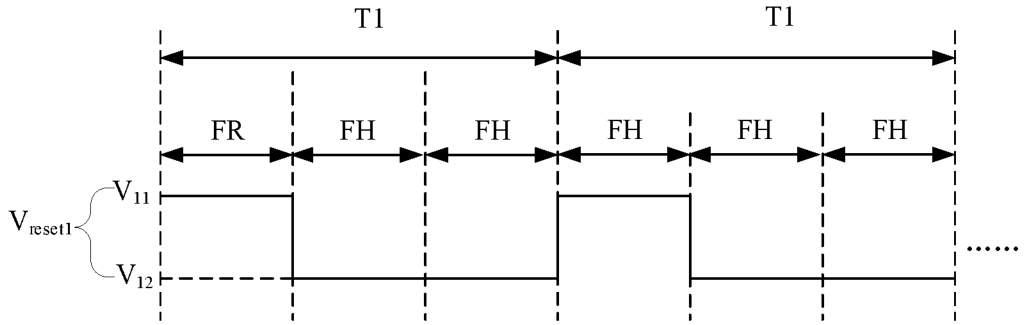
FIG. 4 is a timing diagram of a reset signal of the display panel during a first screen refresh cycle according to some embodiments of the present disclosure.
Figure 5:
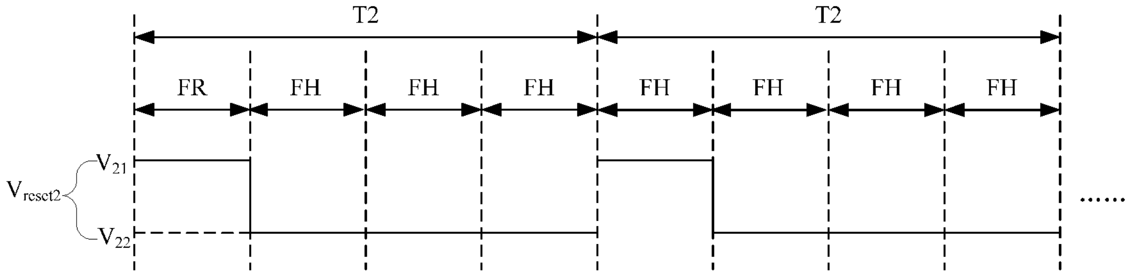
FIG. 5 is a timing diagram of the reset signal of the display panel during a second screen refresh cycle according to some embodiments of the present disclosure.

Refer to FIG. 4 and FIG. 5. FIG. 4 is a timing diagram of a reset signal of the display panel during a first screen refresh cycle according to some embodiments of the present disclosure, and FIG. 5 is a timing diagram of the reset signal of the display panel during a second screen refresh cycle according to some embodiments of the present disclosure. The display panel 100 may include N holding frames FH in a first screen refresh period T1 and M holding frames FH in a second screen refresh period T2, where M and N may be unequal natural numbers. The pixel circuit 101 may correspond to different reset signals $V_{reset}$ in the first screen refresh period T1 and the second screen refresh period T2.

The refresh frequency can represent the number of times the pixel circuit 101 completes data writing in a unit time, and 1 s can be set as the unit time. Each data writing of the pixel circuit 101 may correspond to one refresh frame FR, and the power consumption can be reduced by reducing the refresh frequency. More specifically, a holding frame FH may be added between two adjacent refresh frames FR to reduce the refresh frequency.

As described in the following embodiments, the refresh frame FR may include a data writing stage and a light emitting stage, while the holding frame FH may include the light emitting stage, but not the data writing stage.

For a high refresh frequency display mode including only the refresh frame FR, the screen refresh period T may include one refresh frame FR. For a low refresh frequency display mode including the refresh frame FR and the holding frame FH, the screen refresh period T may include a refresh frame FR and the holding frame FH between the next refresh frame FR and the refresh frame FR.

In some embodiments, the definition of the first screen refresh period T1 and the second screen refresh period T2 may include two different sub-display areas, such as a first sub-display area AA1 and a second sub-display area AA2, corresponding to the first screen refresh period T1 and the second screen refresh period T2 in the same period of time. The pixel circuit 101 in the first sub-display area may be at the first refresh frequency and have the first screen refresh period T1, and the second sub-display area may be at the second refresh frequency and have the second screen refresh period T2. In other embodiments, the definition of the first screen refresh period T1 and the second screen refresh period T2 may include the same sub-display area corresponding to different screen refresh periods T in different periods of time. For example, the pixel circuit 101 in the first sub-display area AA1 may be at the first refresh frequency and have the first screen refresh period T1 in one period of time, and the first sub-display area AA1 may be at the second refresh frequency and have the second screen refresh period T2 in another period of time.

For screen refresh periods T with different numbers of holding frames FH, different reset signals $V_{reset}$ may be respectively set correspondingly. For example, the first screen refresh period T1 and the second screen refresh period T2 may have different numbers of holding frames FH, that is, M may not be equal to N. The node voltage of the pixel circuit 101 may be set by providing a suitable reset signal $V_{reset}$ for different screen refresh periods T, thereby avoiding the flickering and unevenness of the display screen.

As shown in FIG. 4, in the first screen refresh period T1, two holding frames FH are continuously set after the refresh frame FR, that is, N=2. The pixel circuit 101 corresponds to the first reset signal $V_{reset1}$. The first reset signal $V_{reset1}$ is $V_{11}$ in the refresh frame FR, and the first reset signal $V_{reset1}$ is $V_{12}$ in the holding frame FH, $V_{11}$ being different from $V_{12}$.

As shown in FIG. 5, in the second screen refresh period T2, three holding frames FH are continuously set after the refresh frame FR, that is, M=3. The pixel circuit 101 corresponds to the second reset signal $V_{reset2}$. The second reset signal $V_{reset2}$ is $V_{21}$ in the refresh frame FR, and the second reset signal $V_{reset2}$ is $V_{22}$ in the holding frame FH, $V_{11}$ being different from $V_{12}$.

In some embodiments, in order to facilitate the timing control of the reset signal $V_{reset}$, the reset signal $V_{reset}$ corresponding to the refresh frame FR may be set to be the same in different refresh frequencies, that is, $V_{11}$ may be equal to $V_{21}$, and the reset signal $V_{reset}$ corresponding to the holding frame FH may be kept different in different refresh frequencies, that is, $V_{12}$ and $V_{22}$ may be different. In other embodiments, the reset signal $V_{reset}$ corresponding to the refresh frame FR in different refresh frequencies may also be set to be different, that is, $V_{11}$ and $V_{21}$ may be different; and/or the reset signal $V_{reset}$ corresponding to the holding frame FH in different refresh frequencies may be different, that is, $V_{12}$ and $V_{22}$ may be different.

In some embodiments, different refresh frequencies may correspond to different screen refresh periods T. In a conventional display panel, under different refresh frequencies, the refresh frame FR and the holding frame FH may both use the same reset signal $V_{reset}$, which can cause flickering and unevenness of the display screen. In the embodiments of the present disclosure, at least two different refresh modes can be set, such that the pixel circuit 101 can be at different refresh frequencies, and different refresh frequencies can correspond to different reset signals $V_{reset}$. More specifically, for the at least two different refresh frequencies, the reset signal $V_{reset}$ in the screen refresh period T corresponding to one refresh frequency may be different from the reset signal $V_{reset}$ in the screen refresh period T corresponding to another refresh frequency.

The first screen refresh period T1 and the second screen refresh period T2 may be set to correspond to different refresh frequencies respectively. If both the first screen refresh period T1 and the second screen refresh period T2 have one refresh frame FR and at least one holding frame FH, the two different refresh frequencies corresponding to different reset signals $V_{reset}$ in the screen refresh period T may be that: the holding frame FH in the first screen refresh period T1 and the holding frame FH in the second screen refresh period T2 corresponding to different reset signals $V_{reset}$, and the refresh frame FR in the first screen refresh period T1 corresponding to the same reset signal $V_{reset}$ as the refresh frame FR in the second screen refresh period T2; or, the holding frame FH in the first screen refresh period T1 and the holding frame FH in the second screen refresh period T2 corresponding to different reset signals $V_{reset}$, and the refresh frame FR in the first screen refresh period T1 and the refresh frame FR in the second screen refresh period T2 corresponding to different reset signals $V_{reset}$.

The first screen refresh period T1 and the second screen refresh period T2 may be set to correspond to different refresh frequencies respectively. If the first screen refresh period T1 has one refresh frame FR and no holding frame FH, and the second screen refresh period T2 has one refresh frame FR and at least one holding frame FH, the two different refresh frequencies corresponding to different reset signals $V_{reset}$ in the screen refresh period T may be that: the reset signal $V_{reset}$ corresponding to at least one holding frame FH in the second screen refresh period T2 being different from the reset signal $V_{reset}$ of the refresh frame FR. The reset signals $V_{reset}$ corresponding to the refresh frame FR in the first screen refresh period T1 and the refresh frame FR in the second screen refresh period T2 may be different or the same. Alternatively, the reset signal $V_{reset}$ corresponding to at least one holding frame FH in the second screen refresh period T2 may be different from the reset signal $V_{reset}$ of the refresh frame FR in the first screen refresh period T1. The reset signals $V_{reset}$ corresponding to the refresh frame FR in the first screen refresh period T1 and the refresh frame FR in the second screen refresh period T2 may be different or the same.

In a first implementation, the display panel 100 may include different first sub-display areas AA1 and second sub-display areas AA2. The pixel circuit 101 in the first sub-display area AA1 and the second sub-display area AA2 may be respectively set at different refresh frequencies, corresponding to different screen refresh periods T respectively. More specifically, the pixel circuit 101 in the first sub-display area AA1 may be set to be at the first refresh frequency, and have the first screen refresh period T1 at the first refresh frequency, corresponding to the first reset signal $V_{reset1}$ shown in FIG. 4, and the pixel circuit 101 in the second sub-display area AA2 may be set to be at the second refresh frequency, and have the second screen refresh period T2 at the second refresh frequency, corresponding to the second reset signal $V_{reset2}$ shown in FIG. 5. In this way, since the two different sub-display areas correspond to different refresh frequencies, the two sub-display areas can perform display control separately. Therefore, the display time of the pixel circuit 101 in the first sub-display area AA1 in the first screen refresh period T1 and the display time of the pixel circuit 101 in the second sub-display area AA2 in the second screen refresh period T2 may or may not overlap.

Figure 6:
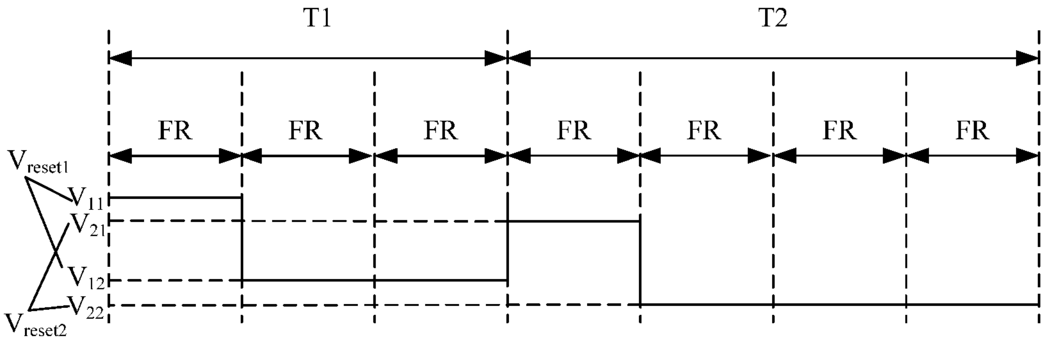
FIG. 6 is a timing diagram of the reset signal of the same sub-display area under two adjacent different screen refresh period according to some embodiments of the present disclosure.
Figure 7:
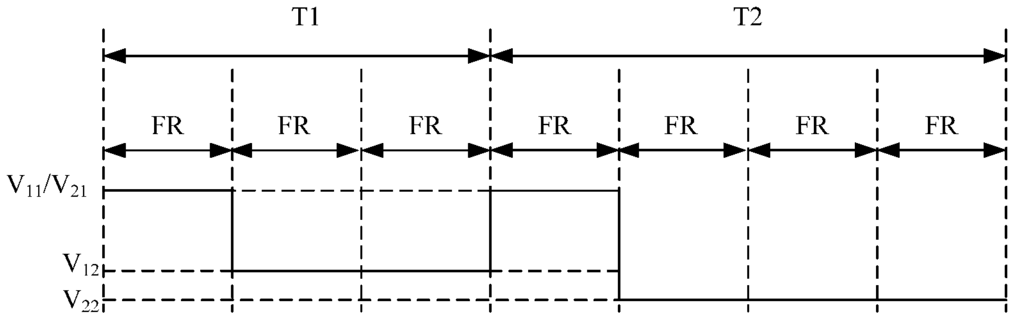
FIG. 7 is another timing diagram of the reset signal of the same sub-display area under two adjacent different screen refresh period according to some embodiments of the present disclosure.

In a second implementation, as shown in FIG. 6 or FIG. 7, the same sub-display area in the display panel 100 may be set to be at different refresh frequencies in different time periods, corresponding to different screen refresh periods T respectively.

FIG. 6 is a timing diagram of the reset signal of the same sub-display area under two adjacent different screen refresh period according to some embodiments of the present disclosure. The display panel 100 may include at least a first sub-display area AA1, and the first sub-display area AA1 may be set to be at different refresh frequencies at different time periods, corresponding to different screen refresh periods T respectively. More specifically, the first sub-display area AA1 may be set to be at the first refresh frequency for a period of time with the first screen refresh period T1, corresponding to the first reset signal $V_{reset1}$, and the first sub-display area AA1 may be set to be at the second refresh frequency for another non-overlapping period of time with the second screen refresh period T2, corresponding to the second reset signal $V_{reset2}$.

In the embodiment shown in FIG. 6, in the first screen refresh period T1, the first reset signal $V_{reset1}$ is $V_{11}$ in the refresh frame FR, and the first reset signal $V_{reset1}$ is $V_{12}$ in the holding frame FH, $V_{11}$ being different from $V_{12}$; and in the second screen refresh period T2, the second reset signal $V_{reset2}$ is $V_{21}$ in the refresh frame FR, and the second reset signal $V_{reset2}$ is $V_{22}$ in the holding frame FH, $V_{21}$ being different from $V_{22}$.

FIG. 7 is another timing diagram of the reset signal of the same sub-display area under two adjacent different screen refresh period according to some embodiments of the present disclosure. This embodiment is different from the embodiment shown in FIG. 6 in that, in order to facilitate the timing control of the reset signal $V_{reset}$, the first screen refresh period T1 and the second screen refresh period T2 may be set to have the same reset signal $V_{reset}$ in the refresh frame FR, that is, $V_{11}$ may be equal to $V_{21}$. The holding frame FH may have different reset signals $V_{reset}$, that is, $V_{12}$ and $V_{22}$ ma be different, and the reset signals $V_{reset}$ corresponding to the holding frame FH and the refresh frame FR in the same screen refresh period T may be different.

In the embodiments of the present disclosure, for two different screen refresh frequencies, the corresponding screen refresh periods T of the two may have different numbers of holding frames FH. In order to facilitate timing control, two different screen refresh frequencies may be set to have the same reset signal $V_{reset}$ in the refresh frame FR. Since two different refresh frequencies have different numbers of holding frames FH in one screen refresh period T, the different numbers of holding frames FH can cause the pixel circuits to hold data at the first node N1 for different durations. By setting different refresh frequencies to correspond to different reset signals $V_{reset}$ in the holding frame FH, and setting the same reset signal $V_{reset}$ in the refresh frame FR, the timing of the reset signal $V_{reset}$ in the refresh frame FR will not be affected, and at the same time, the effect of different duration of data retention on the display due to changes in refresh frequency can be improved.

Figure 8:
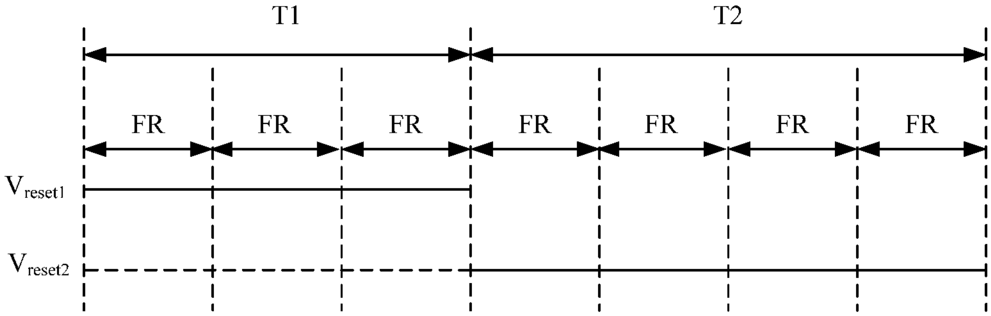
FIG. 8 is another timing diagram of the reset signal of the same sub-display area under two adjacent different screen refresh period according to some embodiments of the present disclosure.

FIG. 8 is another timing diagram of the reset signal of the same sub-display area under two adjacent different screen refresh period according to some embodiments of the present disclosure. In this embodiment, the first screen refresh period T1 and the second screen refresh period T2 may correspond to different refresh frequencies respectively, and have different number of holding frames FH. In the first screen refresh period T1, the holding frame FH and the refresh frame FR may have the same first reset signal $V_{reset1}$, and in the second screen refresh period T2, the holding frame FH and the refresh frame FR may have the same second reset signal $V_{reset2}$, and the first reset signal $V_{reset1}$ may be different from the second reset signal $V_{reset2}$.

In the embodiments of the present disclosure, for the same screen refresh period T, the relationship between the reset signal $V_{reset}$ corresponding to the refresh frame FR and the reset signal $V_{reset}$ corresponding to the holding frame FH, as well as the relationship between the reset signals $V_{reset}$ corresponding to different holding frames FH in the same screen refresh period T may be set based on requirements.

In the embodiments of the present disclosure, the first screen refresh period T1 and the second screen refresh period T2 may be two screen refresh periods T that do not overlap in time in the same sub-display area, or the first screen refresh period T1 and the second screen refresh period T2 may be screen refresh periods T corresponding to different sub-display areas respectively.

Figure 9:
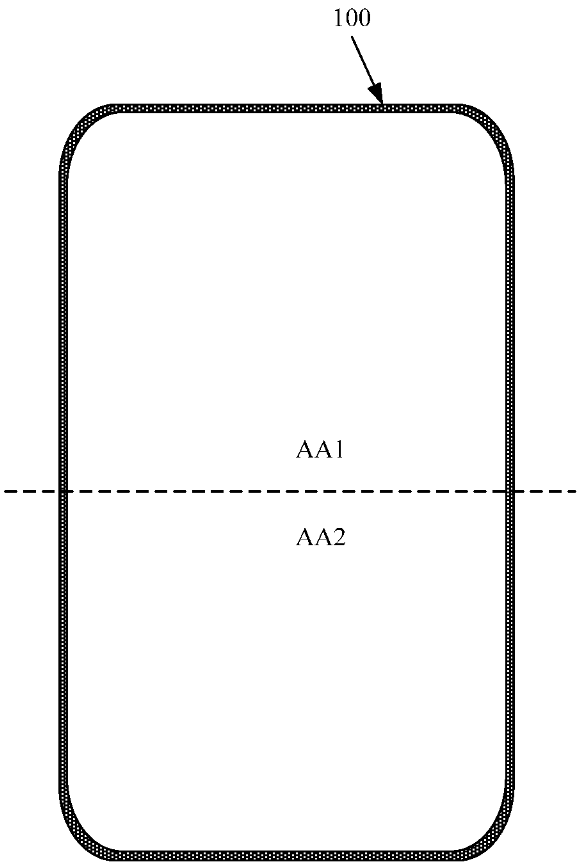
FIG. 9 is a schematic diagram of a display partition for display driving according to some embodiments of the present disclosure.

FIG. 9 is a schematic diagram of a display partition for display driving according to some embodiments of the present disclosure. As shown in FIG. 9, the display panel 100 includes at least a first sub-display area AA1 and a second sub-display area AA2, and the first sub-display area AA1 and the second sub-display area AA2 do not overlap. At a given time, the first sub-display area AA1 and the second sub-display area AA2 may be at different refresh frequencies.

The display panel may include a plurality of sub-display areas, and at a given time, at least two sub-display areas may be at different refresh frequencies. It should be understood that the number of sub-display areas in the display panel 100 can be set to any number based on the display requirements, and is not limited to the two sub-display areas shown in FIG. 9.

In the embodiment shown in FIG. 9, at a given time, the first sub-display area AA1 and the second sub-display area AA2 may be at different refresh frequencies. The first sub-display area AA1 and the second sub-display area AA2 at different refresh frequencies may correspond to different reset signals $V_{reset}$ respectively. In this way, the pixel circuit 101 may reset the node voltage in the pixel circuit 101 through a suitable reset signal $V_{reset}$ at the current refresh frequency, thereby avoiding the flickering and unevenness of the display screen.

It should be noted that when the display panel 100 includes a plurality of sub-display areas, the dotted line between two sub-display areas in FIG. 9 is not a real boundary line in the display panel 100. When the display panel 100 is in a black screen state, there is no visually perceptible boundary lines between different sub-display areas. When images are being displayed, the boundary lines between sub-display areas may be determined based on the boundaries of different images being displayed at the current refresh frequency of the sub-display areas.

It should be noted that when the display panel 100 includes a plurality of sub-display areas, each of the sub-display areas in the display panel 100 may have an independent scanning circuit. In this way, different sub-display areas can input scanning signals respectively and independently control the refresh frequency of the sub-display areas.

When the display panel 100 includes a plurality of sub-display areas, the number of sub-display areas in the display panel and the refresh frequency of the pixel circuit 101 in each sub-display area can be set based on requirements.

Figure 10:
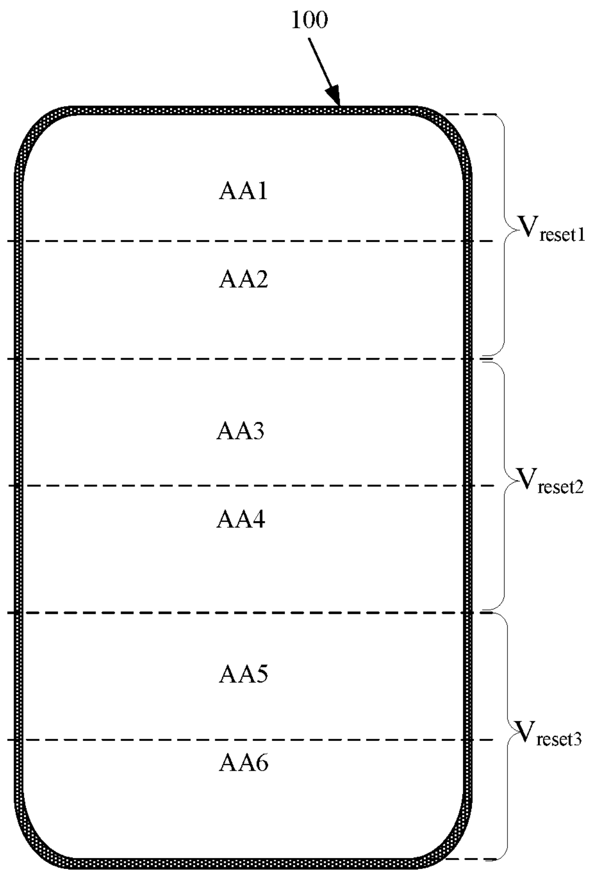
FIG. 10 is a schematic diagram of another display partition for display driving according to some embodiments of the present disclosure.

FIG. 10 is a schematic diagram of another display partition for display driving according to some embodiments of the present disclosure. As shown in FIG. 10, the display area AA includes the first sub-display area AA1 to the sixth sub-display area AA6 distributed in sequence in the direction of the light-emitting element column.

In the embodiment shown in FIG. 10, the first sub-display area AA1 and the second sub-display area AA2 may be at the same refresh frequency and correspond to the same first reset signal $V_{reset1}$; the third sub-display area AA3 and the fourth sub-display area AA4 may be at the same refresh frequency and correspond to the same second reset signal $V_{reset2}$; and the fifth sub-display area AA5 and the sixth sub-display area AA6 may be at the same refresh frequency and correspond to the same first reset signal $V_{reset3}$.

In order to simplify the timing control, a refresh frequency less than a set threshold may be set to correspond to the same reset signal $V_{reset}$, and a refresh frequency greater than the set threshold may be set to correspond to the same reset signal $V_{reset}$. The set threshold may be set based on needs. For example, the set threshold may be 120 Hz. In some embodiments, the refresh frequency corresponding to the first sub-display area AA1 may be set to 10 Hz, the refresh frequency corresponding to the second sub-display area AA2 may be set to 30 Hz, the reset signal corresponding to the third sub-display area AA3 and the fourth sub-display area AA4 may be set to 120 Hz, the refresh frequency corresponding to the fifth sub-display area AA5 may be set to 60 Hz, and the refresh frequency corresponding to the sixth sub-display area AA6 may be set to 24 Hz. At this time, the first sub-display area AA1, the second sub-display area AA2, the fifth sub-display area AA5, and the sixth sub-display area AA6 may correspond to the same reset signal $V_{reset}$, that is, the first reset signal $V_{reset1}$ may be the same as the second reset signal $V_{reset2}$. It should be noted that the refresh frequency corresponding to each sub-display area can be set based on requirements, which is not limited in the embodiments of the present disclosure.

In the embodiments of the present disclosure, the pixel circuits 101 in two different sub-display areas being respectively at different refresh frequencies and corresponding to different reset signal $V_{reset}$ may include the pixel circuits 101 in one sub-display area and the other sub-display area corresponding to different reset signal $V_{reset}$ in the refresh frame FR, and/or the pixel circuits 101 in one sub-display area and the other sub-display area corresponding to different reset signals $V_{reset}$ in the holding frame FH. The pixel circuits 101 in two different sub-display areas being at the same refresh frequency and corresponding to the same reset signal $V_{reset}$ may include the pixel circuits 101 in one sub-display area and the other sub-display area corresponding to the same reset signal $V_{reset}$ in the refresh frame FR, and the pixel circuits 101 in the one sub-display area and the other sub-display area corresponding to the same reset signal $V_{reset}$ in the holding frame FH.

In some embodiments, when the display panel 100 includes a plurality of sub-display areas corresponding to different refresh frequencies in the same period of time, the low refresh frequency mode where the refresh frequency is less than the set threshold, the reset signal $V_{reset}$ of the holding frame FH may be the same, the reset signal $V_{reset}$ of the refresh frame FR may be the same, and reset signal $V_{reset}$ of the holding frame FH may be different from the reset signal $V_{reset}$ of the refresh frame FR. Further, in the high refresh frequency mode where the refresh frequency is not less than the set threshold, the holding frame FH and the refresh frame FR may have the same reset signal $V_{reset}$.

Figure 11:
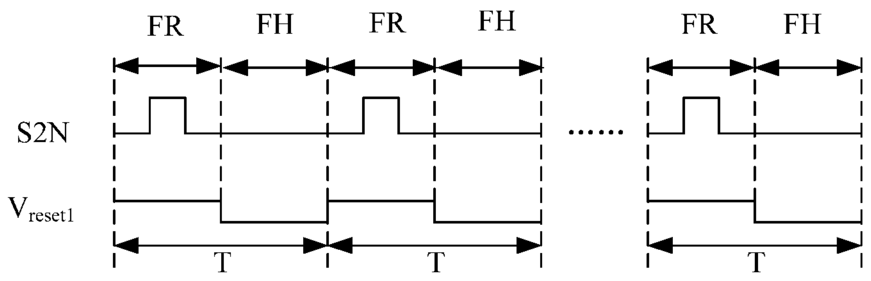
FIG. 11 is a timing diagram of the pixel circuit in a first refresh frequency period according to some embodiments of the present disclosure.
Figure 12:
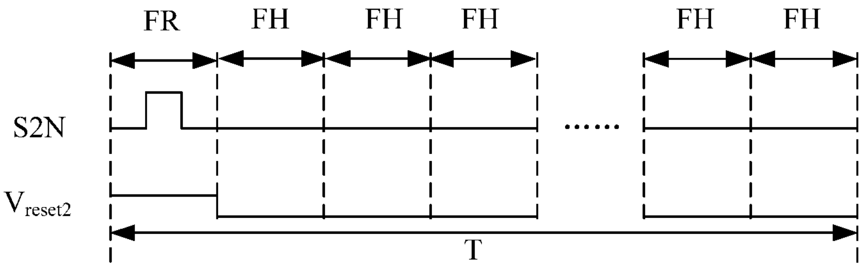
FIG. 12 is a timing diagram of the pixel circuit in a second refresh frequency period according to some embodiments of the present disclosure.
Figure 21:
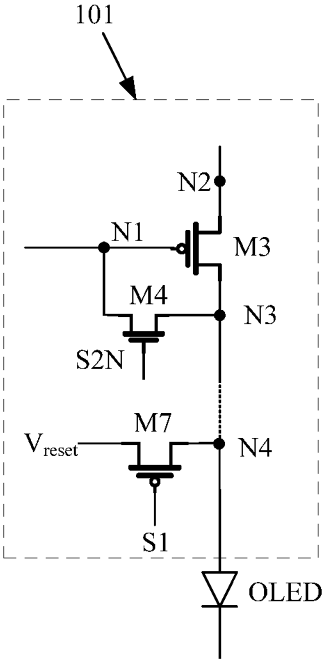
FIG. 21 is a schematic structural diagram of another pixel circuit according to some embodiments of the present disclosure.

FIG. 11 is a timing diagram of the pixel circuit in a first refresh frequency period according to some embodiments of the present disclosure, and FIG. 12 is a timing diagram of the pixel circuit in a second refresh frequency period according to some embodiments of the present disclosure. The pixel circuit 101 may include a first refresh mode and a second refresh mode. The structure of the pixel circuit 101 may be as shown in FIG. 21 in the subsequent embodiments.

As shown in FIG. 11, in the first sub-display area AA1, the pixel circuit 101 may be at the first refresh frequency in the first refresh mode, corresponding to the first reset signal $V_{reset1}$. The first scan signal S2N input to the gate of the compensation transistor M4 may represent the first refresh frequency, and the reset signal $V_{reset}$ input to the gate of the first reset transistor M7 may be the first reset signal $V_{reset1}$.

As shown in FIG. 12, in the second sub-display area AA2, the pixel circuit 101 may be at the second refresh frequency in the second refresh mode, corresponding to the second reset signal $V_{reset2}$. The first scan signal S2N input to the gate of the compensation transistor M4 may represent the second refresh frequency, and the reset signal $V_{reset}$ input to the gate of the first reset transistor M7 may be the second reset signal $V_{reset2}$.

In the embodiments shown in FIG. 11 and FIG. 12, the first refresh frequency may be different from the second refresh frequency, and the first reset signal $V_{reset1}$ may be different from the second reset signal $V_{reset2}$. Further, the refresh frequency of the pixel circuit 101 may be related to the switching frequency of the input first scan signal S2N.

In the embodiments shown in FIG. 11 and FIG. 12, the display panel 100 may include at least a first sub-display area AA1 and a second sub-display area AA2. The pixel circuits 101 in the first sub-display area AA1 and the second sub-display area AA2 may respective be in different refresh modes, corresponding to different refresh frequencies. For example, the pixel circuit 101 in the first sub-display area AA1 may be in the first refresh mode, that is, the pixel circuit 101 may be in the first refresh frequency, and the node voltage of the pixel circuit 101 may be reset by the first reset signal $V_{reset1}$ suitable for the first refresh frequency. Further, the pixel circuit 101 in the second sub-display area AA2 may be in the second refresh mode, that is, the pixel circuit 101 may be in the second refresh frequency, and the node voltage of the pixel circuit 101 may be reset by the second reset signal $V_{reset2}$ suitable for the second refresh frequency. In this way, not only the display driving power consumption can be reduced, the pixel circuit 101 can also reset the node voltage in the pixel circuit 101 through the suitable reset signal $V_{reset}$ at the current refresh frequency, thereby avoiding the flickering and unevenness of the display screen.

Take 1 s as the unit time. If the first refresh frequency is 60 Hz, at the first refresh frequency, 1 s may include 60 refresh frames FR and 60 holding frames FH, and one refresh frame FR and its subsequent adjacent holding frame FH may be a screen refresh period T. As shown in FIG. 11, the first frame is the refresh frame FR, and the refresh frame FR and the holding frame FH are alternately arranged. The first scan signal S2N has a pulse-on period in the refresh frame FR. The pixel circuit 101 may perform data writing once in the refresh frame FR, and remain off in the holding frame FH. The pixel circuit 101 may not perform data writing in the holding frame FH, and the pixel circuit 101 may correspond to different first reset signal $V_{reset1}$ in the refresh frame FR and the holding frame FH, respectively.

Take 1 s as the unit time. If the second refresh frequency is 1 Hz, at the second refresh frequency, 1 s may include one refresh frame FR and 119 holding frames FH, and one refresh frame FR and its subsequent 119 continuous holding frames FH may be a screen refresh period T. Similarly, first scan signal S2N has a pulse-on period in the refresh frame FR. The pixel circuit 101 may perform data writing once in the refresh frame FR, and remain off in the holding frame FH. The pixel circuit 101 may not perform data writing in the holding frame FH, and the pixel circuit 101 may correspond to different second reset signal $V_{reset2}$ in the refresh frame FR and the holding frame FH, respectively.

In the embodiments of the present disclosure, the pixel circuit 101 may be set to correspond to different reset signal $V_{reset}$ in different screen refresh periods T respectively in the same sub-display area of the display panel 100. For example, when two adjacent screen refresh periods T correspond to different reset signals $V_{reset}$ in the same sub-display area, the timing diagram of the pixel circuit 101 may be as shown in FIG. 13.

Figure 13:
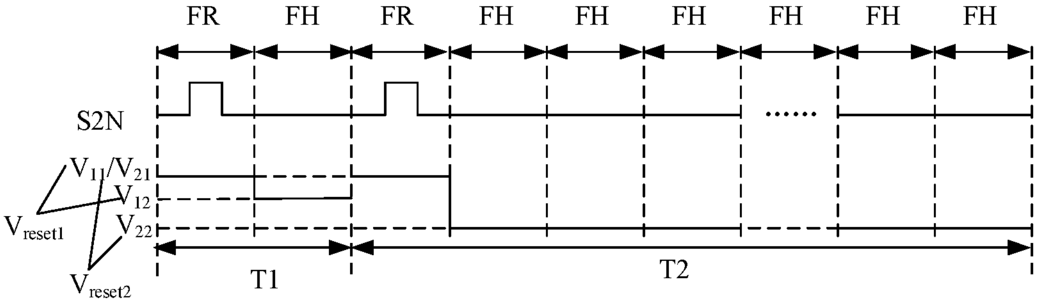
FIG. 13 is a timing diagram of a first sub-display area in the display panel according to some embodiments of the present disclosure.

FIG. 13 is a timing diagram of a first sub-display area in the display panel according to some embodiments of the present disclosure. The display panel 100 may include at least a first sub-display area AA1. At this time, the sub-display areas in the display panel may be divided as shown in FIG. 9, and the display panel 100 may be set to include two sub-display areas, more than two sub-display areas, or only one first sub-display area AA1, that is, the display area of the entire display panel 100 may be the first sub-display area AA1. In the first sub-display area AA1, the pixel circuit 101 may correspond to different reset signals $V_{reset}$ in the first screen refresh period T1 and the second screen refresh period T2. The first screen refresh period T1 and the second screen refresh period T2 may be two screen display stages in the first sub-display area AA1 that do not overlap in time.

In the embodiment shown in FIG. 13, the pixel circuits 101 in the same sub-display area can be at different refresh frequencies in different screen refresh periods, thereby corresponding to different reset signals. In this way, not only the same sub-display area can perform image display with different refresh frequencies and reduce the display driving power consumption, but the pixel circuit 101 can also reset the node voltage in the pixel circuit 101 through a suitable reset signal $V_{reset}$ at the current refresh frequency, thereby avoiding the flickering and unevenness of the display screen.

In some embodiments, the first screen refresh period T1 may be set to precede the timing of the second screen refresh period T2. In the first screen refresh period T1, at the first refresh frequency, the pixel circuit 101 in the first sub-display area AA1 may correspond to the first reset signal $V_{reset1}$. In the second screen refresh period T2, at the second refresh frequency, the pixel circuit 101 in the first sub-display area AA1 may correspond to the second reset signal $V_{reset2}$. The first reset signal $V_{reset1}$ and the second reset signal $V_{reset2}$ may be the same in the refresh frame FR and different in the holding frame FH, that is, $V_{11}=V_{12}$, and $V_{21} \neq V_{22}$.

If a screen refresh period T has a holding frame FH, the refresh frequency may be negatively related to the number of holding frames FH. That is, the larger the refresh frequency, the smaller the number of holding frames FH in one screen refresh period T, on the contrary, the smaller the refresh frequency, the more the number of holding frames FH in one screen refresh period T. The number of holding frames in the screen refresh period T represents the time period that the first node N1 needs to hold the data signal, therefore, the smaller the refresh frequency, the longer the data signal needs to be held. At a relatively low refresh frequency, in order to achieve a longer data holding time, for the same screen refresh period T, the reset signal $V_{reset}$ of the holding frame FH may be set to be no greater than the reset signal $V_{reset}$ of the refresh frame FR, and the reset signal $V_{reset}$ of at least one holding frame FH may be positively correlated to with the refresh frequency. That is, the larger the refresh frequency, the larger the reset signal of the at least one holding frame FH, on the contrary, the smaller the refresh frequency, the smaller the reset signal $V_{reset}$ of the at least one holding frame FH. In this way, the reset signal $V_{reset}$ in one screen refresh period T can be adapted to the refresh frequency, thereby avoiding the flickering and unevenness of the display screen.

Figure 14:
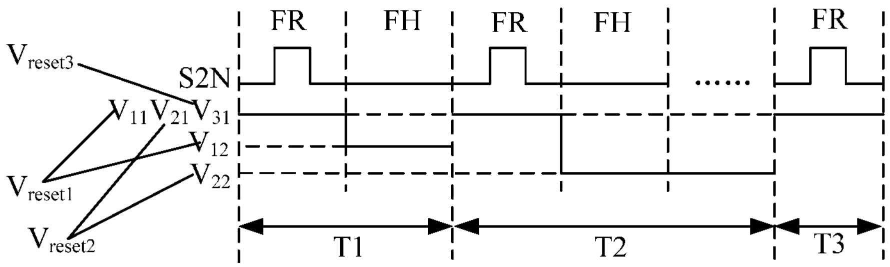
FIG. 14 is a timing diagram of the first sub-display area in three consecutive screen refresh periods according to some embodiments of the present disclosure.

In the embodiments of the present disclosure, in the same sub-display area of the display panel 100, the pixel circuit 101 may be set to correspond to different reset signal $V_{reset}$ in different screen refresh periods T respectively. If the same sub-display area corresponds to different reset signal $V_{reset}$ in three consecutive screen refresh periods T, at this time, the timing diagram of the pixel circuit 101 may be as shown in FIG. 14. In some embodiments, different screen refresh periods T may have different numbers of holding frames FH.

FIG. 14 is a timing diagram of the first sub-display area in three consecutive screen refresh cycles according to some embodiments of the present disclosure. In this embodiment, the display panel 100 has a third screen refresh period T3 that does not overlap with the first screen refresh period T1 and the second screen refresh period T2, and the three screen refresh periods may correspond to different refresh modes respectively. As shown in FIG. 14, the second screen refresh period T2 is arranged after the first screen refresh period T1, and the screen refresh period T3 is arranged after the second screen refresh period T2.

In the first sub-display area AA1, the pixel circuit 101 may respectively be at different refresh frequencies in the three screen refresh periods, and correspond to the set reset signals respectively. For example, in the first screen refresh period T1, at the first refresh frequency, the pixel circuit 101 may correspond to the first reset signal $V_{reset1}$; in the second screen refresh period T2, at the second refresh frequency, the pixel circuit 101 may correspond to the second reset signal $V_{reset2}$; and, in the screen refresh period T3, at a third refresh frequency, the pixel circuit 101 may correspond to a third reset signal $V_{reset3}$. In some embodiments, The first screen refresh period T1 and the second screen refresh period T2 may both include a refresh frame FR and a holding frame FH, and the screen refresh period T3 may include a refresh frame FR without any holding frame FH. The first reset signal $V_{reset1}$ may be $V_{11}$ in the refresh frame FR, $V_{12}$ in the holding frame FH; the second reset signal $V_{reset2}$ may be $V_{21}$ in the refresh frame FR, $V_{22}$ in the holding frame FH; and the reset signal $V_{reset3}$ may be $V_{31}$ in the refresh frame FR. In other embodiments, the number of holding frames FH in the three screen refresh periods T can be set based on requirements, which is not limited in the embodiment shown in FIG. 14.

In the embodiment shown in FIG. 14, the first refresh frequency may be 60 Hz, corresponding to the first screen refresh period T1 having a refresh frame FR and a holding frame FH after the refresh frame FR; the second refresh frequency may be 1 Hz, corresponding to the second screen refresh period T2 having a refresh frame FR and a holding frame FH after the refresh frame FR; and the third refresh frequency may be 120 Hz, corresponding to the screen refresh period T3 having a refresh frame FR and no holding frame FH. Under different refresh frequencies, the corresponding screen refresh periods may be different.

FIG. 13 and FIG. 14 are timing diagrams of the reset signal $V_{reset}$ performed in one screen refresh period T under different refresh frequencies. In actual display scenarios, if the same sub-display area has different refresh frequencies in different periods of time, when display at different refresh frequencies, each refresh frequency may have one or more refresh periods T. For example, after one or more first screen refresh periods T1 at the first refresh frequency, the display may be switched to the second refresh frequency, and after one or more second screen refresh periods T2 at the second refresh frequency, the display may be switched to the third refresh frequency, and display for one or more screen refresh periods T3 at the third refresh frequency.

In the embodiment shown in FIG. 14, the pixel circuits 101 in the same sub-display area can have different screen refresh periods T in different periods of time, corresponding to different refresh frequencies respectively, thereby corresponding to different reset signals $V_{reset}$. In this way, not only the same sub-display area can perform image display with different refresh frequencies and reduce the display driving power consumption, but the pixel circuit 101 can also reset the node voltage in the pixel circuit 101 through a suitable reset signal $V_{reset}$ at the current refresh frequency, thereby avoiding the flickering and unevenness of the display screen.

It should be understood that in the embodiments of the present disclosure, the reset signal $V_{reset}$ corresponding to the pixel circuit 101 in each screen refresh period T may be related to the refresh frequency, and is not limited to the timing diagrams shown in the accompanying drawings of the present disclosure.

Figure 15:
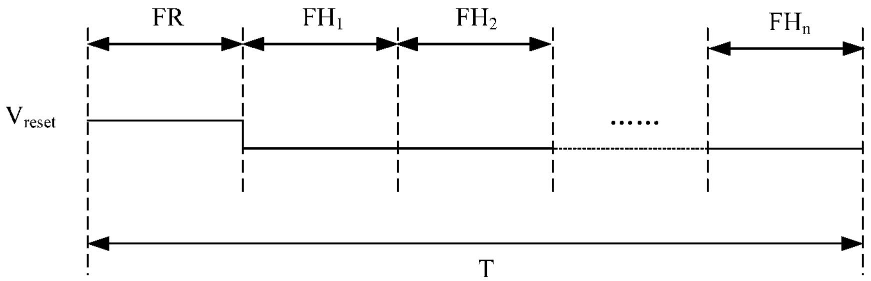
FIG. 15 is a timing diagram of the display panel in the same screen refresh cycle.

FIG. 15 is a timing diagram of the display panel in the same screen refresh cycle. In some embodiments, the same screen refresh period T may have a refresh frame FR and a plurality of holding frames FH located after the refresh frame FR. In the same screen refresh period T, the pixel circuit 101 may be at the corresponding refresh frequency, such that the reset signal $V_{reset}$ corresponding to the holding frame FH of the pixel circuit 101 in at least one holding frame FH can be different from the reset signal $V_{reset}$ corresponding to the refresh frame FR.

In some embodiments, in one screen refresh period T, the number of refresh frames FR and holding frames FH may be related to the refresh frequency. In some cases, the higher the refresh frequency, the smaller the number of holding frames FH.

In a conventional display panel, the pixel circuit 101 uses the same reset signal $V_{reset}$ for the refresh frame FR and the holding frame FH, which causes flickering and unevenness of the display screen, especially during lower frequency display. This is because the driving timing of the pixel circuit 101 in the holding frame FH is different from the driving timing of the refresh frame FR. If the reset signal $V_{reset}$ is the same in the refresh frame FR and the holding frame FH, the reset signal $V_{reset}$ and the refresh frequency will be incompatible, resulting in flickering and unevenness of the display screen.

In the embodiments of the present disclosure, in the same screen refresh period T, if there is a holding frame FH, the reset signal $V_{reset}$ corresponding to the holding frame FH of the pixel circuit 101 in at least one holding frame FH can be different from the reset signal $V_{reset}$ corresponding to the refresh frame FR. In this way, the reset signal $V_{reset}$ can be compatible with the refresh frequency, thereby avoiding flickering and unevenness of the display screen.

In the embodiment shown in FIG. 15, a screen refresh period T with one refresh frame FR and n consecutively arranged holding frames FH located after the refresh frame FR is taken as an example for description. The n holding frames FH are sequentially the first holding frame $FH_1$ to the nth holding frame $FH_n$, where n is a positive integer greater than 1. As described above, the number and timing of the refresh frame FR and the holding frames FH in one screen refresh period T may be determined based on the refresh frequency.

In the embodiments of the present disclosure, the refresh frequency of the pixel circuit 101 may be set based on display requirements. In some embodiments, the unit time can be set to 1 s. Within 1 s, if there are 120 refresh frames FR and there is no holding frame FH between the refresh frames FR, the refresh frequency may be 120 Hz. Within 1 s, if there are 60 refresh frames FR, and there is a holding frame FH between any two adjacent refresh frames FR and after the last refresh frame FR, the refresh frequency may be 60 Hz. Within 1 s, if there are 30 holding frames FH, and there are three holding frames FH between any two adjacent refresh frames FR and after the last refresh frame FR, the refresh frequency may be 30 Hz. Within 1 s, if there are 119 consecutive holding frames FH after the refresh frame FR, the refresh frequency may be 1 Hz. Within 1 s, if there are 144 refresh frames FR, and there is no holding frame FH between the refresh frames FR, the refresh frequency may be 144 Hz.

The pixel circuit 101 may be controlled to be at a desired refresh frequency by controlling the switching frequency of the first scan signal S2N. The embodiments of the present disclosure do not specifically limit the refresh frequency at which the pixel circuit 101 is at. In some embodiments, the refresh frequency may be the frequency at which the first scan signal S2N is turned on in a unit time.

In the embodiment shown in FIG. 15, in the same screen refresh period T, the reset signals $V_{reset}$ corresponding to the pixel circuit 101 in the holding frames FH are the same, and the reset signals $V_{reset}$ in the refresh frames FR are different. In this way, in the same screen refresh period T, the same reset signal $V_{reset}$ can be used in all holding frames FH, which facilitates the control of the driving timing of the reset signal $V_{reset}$.

Figure 16:
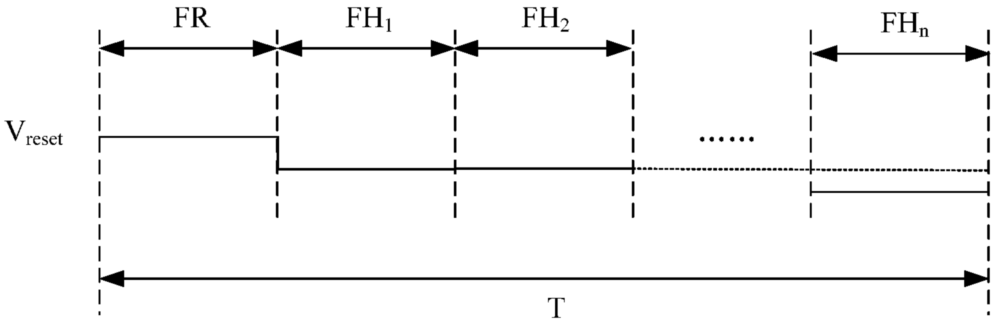
FIG. 16 is another timing diagram of the display panel in the same screen refresh cycle.

FIG. 16 is another timing diagram of the display panel in the same screen refresh cycle. In the same screen refresh period T, the reset signals $V_{reset}$ corresponding to the pixel circuit 101 in at least two holding frames FH may be different, and neither may be equal to the reset signal $V_{reset}$ corresponding to the refresh frame FR.

In the embodiment shown in FIG. 16, the reset signals $V_{reset}$ of the first n−1 holding frames FH may be all the same, and these reset signals $V_{reset}$ may be all different from the reset signals $V_{reset}$ of the refresh frame FR. The reset signal $V_{reset}$ in the nth holding frame FHn may be different from the reset signal $V_{reset}$ of the previous n−1 holding frame FH, and may also be different from the reset signal $V_{reset}$ of the refresh frame FR. In this embodiment, the reset signals $V_{reset}$ in any number of holding frames FH may be set to be different from each other, and these reset signals $V_{reset}$ may be different from the corresponding reset signal $V_{reset}$ in the refresh frame FR.

The embodiment shown in FIG. 16 can also allow the pixel circuit 101 to reset the node voltage in the pixel circuit 101 through a compatible reset signal $V_{reset}$ at the refresh frequency, thereby avoiding the flickering and unevenness of the display screen.

Figure 17:
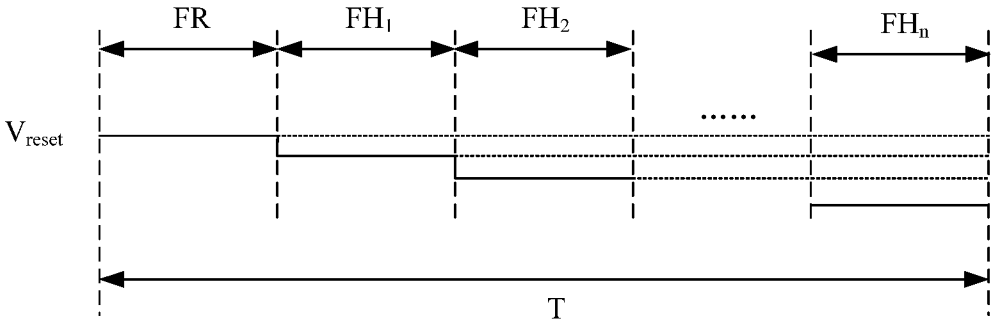
FIG. 17 is another timing diagram of the display panel in the same screen refresh cycle.

FIG. 17 is another timing diagram of the display panel in the same screen refresh cycle. For any two holding frames FH, the reset signal $V_{reset}$ corresponding to the next holding frame FH may be smaller than the reset signal $V_{reset}$ corresponding to the previous holding frame FH. In this embodiment, in the same screen refresh period T, in at least part of the holding frames FH, the reset signal $V_{reset}$ corresponding to the subsequent holding frame FH may be smaller than the reset signal $V_{reset}$ corresponding to the previous holding frame FH.

The embodiment shown in FIG. 17 can also allow the pixel circuit 101 to reset the node voltage in the pixel circuit 101 through a compatible reset signal $V_{reset}$ at the refresh frequency, thereby avoiding the flickering and unevenness of the display screen.

In order to further improve the display quality, as shown in FIG. 17, in the same screen refresh period T, for any two adjacent holding frames FH, the reset signal $V_{reset}$ corresponding to the subsequent holding frame may be smaller than the reset signal $V_{reset}$ corresponding to the previous holding frame FH. In the same screen refresh period T, data signal may not be written in a plurality of consecutive holding frames FH after a refresh frame FR, and the display may be maintained based on the data signal written in the refresh frame FR. Due to the gradual attenuation of the data signal during the display of a plurality of consecutive holding frames FH, abnormal display can occur. in the embodiments of the present disclosure, by setting the reset signal $V_{reset}$ in a plurality of consecutive holding frames FH to decrease in sequence to adapt to the attenuation of the data signal in the period of the plurality of holding frames FH, the display quality can be further improved. In combination with the following embodiments corresponding to the pixel circuit 101 shown in FIG. 21, in the same screen refresh period T, from the first holding frame $FH_1$ to the nth holding frame $FH_n$, the data signal held by the first node N1 may gradually attenuate. Under different refresh frequencies, the number of frames maintained in the corresponding first screen refresh period T1 may be different. Therefore, if the refresh frequency is lower, the more frames can be held in the same screen refresh period T. In one screen refresh period T, from the first holding frame $FH_1$ to the nth holding frame $FH_n$, the potential difference of the first node N1 may be relatively large, which will lead to more serious flickering and unevenness of the display screen. In the embodiments of the present disclosure, based on the above setting, the reset signal $V_{reset}$ can be adapted to the attenuation of the data signals in the plurality of consecutive holding frames FH in the same screen refresh period T, thereby improving the display quality.

Figure 18:
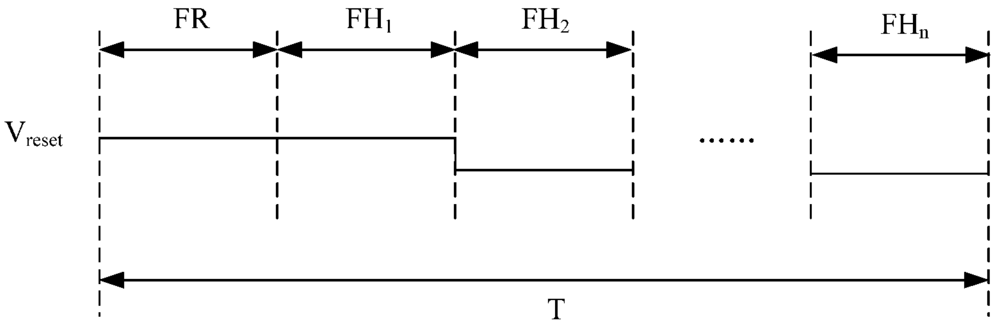
FIG. 18 is another timing diagram of the display panel in the same screen refresh cycle.

FIG. 18 is another timing diagram of the display panel in the same screen refresh cycle. In the same screen refresh period T, the reset signal $V_{reset}$ corresponding to at least one holding frame FH may be the same as the reset signal $V_{reset}$ corresponding to the refresh frame FR. More specifically, in the same screen refresh period T, the reset signal $V_{reset}$ in at least part of the holding frames FH may be the same as the reset signal $V_{reset}$ in the refresh frame FR, and the reset signal $V_{reset}$ in other holding frames may be the same or different from the reset signal $V_{reset}$ in the refresh frame FR. In this embodiment, the part of the holding frames FH may use the same reset signal $V_{reset}$ as the refresh frame FR, and other part of the holding frames FH may use another reset signal $V_{reset}$ uniformly, thereby facilitating the control of the driving timing of the reset signal $V_{reset}$.

In the embodiment shown in FIG. 18, in a plurality of consecutive holding frames FH in the same screen refresh period T, the reset signal $V_{reset}$ in the first holding frame FH and the reset signal $V_{reset}$ in the refresh frame FR are the same as an example for illustration. In this embodiment, any one or more holding frames FH may be set to be the same as the reset signal $V_{reset}$ in the refresh frame FR, and it is not limited to the first holding frame FH.

Figure 19:
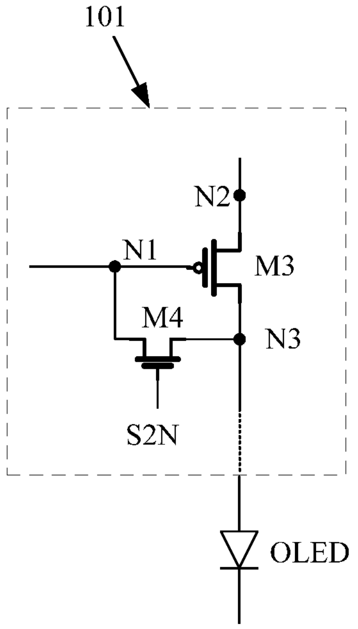
FIG. 19 is a schematic structural diagram of the pixel circuit according to some embodiments of the present disclosure.

FIG. 19 is a schematic structural diagram of the pixel circuit according to some embodiments of the present disclosure. As shown in FIG. 19, the pixel circuit 101 includes a driving transistor M3, the gate of the driving transistor M3 being connected to the first node N1, the first electrode of the driving transistor M3 being connected to the second node N2, and the second electrode of the driving transistor M3 being connected to the third node N3; a compensation transistor M4, the gate of the compensation transistor M4 being used to access the first scan signal S2N, the first electrode of the compensation transistor M4 being connected to the first node N1, and the second electrode of the compensation transistor M4 being connected to the third node N3. In some embodiments, the refresh frequency of the pixel circuit 101 may be the switching frequency of the first scan signal S2N. The third node N3 is connected to the output of the pixel circuit 101, and may provide a driving current for the first electrode of the light-emitting element through the output. In some embodiments, the light-emitting element may be an OLED.

The compensation transistor M4 may reversely bias the driving transistor M3 before data writing at the N1 node, thereby avoiding the hysteresis caused when the driving transistor M3 is turned on again after being turned on for a long time.

In the embodiments of the present disclosure, the refresh frequency of the pixel circuit 101 may be controlled by controlling the first scan signal S2N, thereby realizing the adaptation of the corresponding reset signal $V_{reset}$ and improving the image display quality.

In the embodiments of the present disclosure, a screen refresh period T of the display panel 100 may include a refresh frame FR and N holding frames FH located after the refresh frame FR, where N may be a natural number related to the refresh frequency. If N is greater than 0, the holding frame FH may include a light-emitting stage, and the refresh frame FR may include a data writing stage and a light-emitting stage, where the data writing stage may include writing of data signals.

In the embodiments of the present disclosure, in the data writing stage, the writing of the data signal may refer to the writing of the data signal to the first node N1. The refresh frame FR may include the data writing stage. After the data signal can be written into the second node N2, the driving transistor M3 and the driving transistor M3 may be controlled to be turned on, and the data signal may be written from the second node N2 through the third node N3 to the first node N1, thereby completing the writing of the data signal. In the holding frame FH, the data signal may only be input to the second node N2, and the compensation transistor M4 may be controlled to be turned off by the first scan signal S2N, such that the data signal cannot be written from the second node N2 to the first node n1, therefore, the holding frame FH may not include the data writing stage.

As described above, the pixel circuit 101 may be configured to have at least a first refresh mode and a second refresh mode. Further, in the first refresh mode, the pixel circuit 101 may be set to be at the first refresh frequency, and before the light-emitting element is controlled to emit light, the first electrode of the light-emitting element may be reset by inputting the first reset signal $V_{reset1}$; and in the second refresh mode, the pixel circuit 101 may be set to be at the second refresh frequency, and before the light-emitting element is controlled to emit light, the first electrode of the light-emitting element may be reset by inputting the second reset signal $V_{reset2}$. The first reset signal $V_{reset1}$ may be different from the second reset signal $V_{reset2}$. The output of the pixel circuit 101 may be connected to the first electrode of the light-emitting element, and the first electrode of the light-emitting element may be the anode of the light-emitting element.

In the embodiments of the present disclosure, under different refresh frequencies, before controlling the light-emitting element to emit light, the pixel circuit 101 may input an adapted reset signal $V_{reset}$ to the first electrode of the light-emitting element based on the current refresh frequency, and reset the voltage of the first electrode of the light-emitting element. In this way, the reset signal $V_{reset}$ of the first electrode of the light-emitting element can be adapted to the refresh frequency, thereby avoiding the flickering and unevenness of the display screen.

Figure 20:
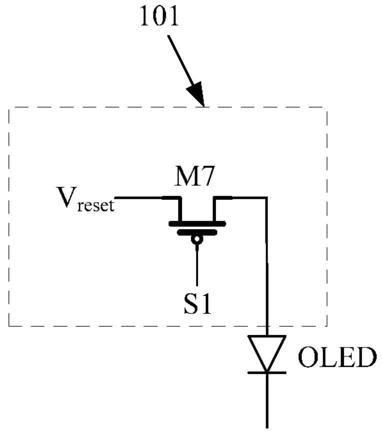
FIG. 20 is a schematic structural diagram of another pixel circuit according to some embodiments of the present disclosure.

FIG. 20 is a schematic structural diagram of another pixel circuit according to some embodiments of the present disclosure. As shown in FIG. 20, the pixel circuit 101 includes a first reset transistor M7, the gate of the first reset transistor M7 being used to electrical connect a first control signal S1, the first electrode of the first reset transistor M7 being used to connect the first electrode of the light-emitting element, and the second electrode of the first reset transistor M7 being used to electrically connect the reset signal $V_{reset}$. That is, the reset module 001 shown in FIG. 2 may include the first reset transistor M7. In this embodiment, the pixel circuit 101 includes the first reset transistor M7, and the first reset transistor M7 may be configured to perform voltage reset on the first electrode of the light-emitting element based on the timing control of the first control signal S1. In this way, the reset signal $V_{reset}$ of the first electrode of the light-emitting element can be adapted to the refresh frequency, thereby avoiding the flickering and unevenness of the display screen.

In the embodiments of the present disclosure, a screen refresh period T of the display panel may include a refresh frame FR and N holding frames FH located after the refresh frame FR, where N may be a natural number related to the refresh frequency. If N is greater than 0, the reset signal $V_{reset}$ corresponding to the pixel circuit 101 in the holding frame FH may not be greater than the reset signal $V_{reset}$ corresponding to the refresh frame FR, and the reset signal $V_{reset}$ corresponding to the pixel circuit 101 in at least one holding frame FH may be different from the reset signal $V_{reset}$ corresponding to the refresh frame FR. In this way, the refresh frequency can be controlled by controlling the number of holding frames in the same screen refresh period T, and the refresh frequency of the pixel circuit 101 can be controlled by inserting a set number of holding frames FH after the refresh frame FR.

In some embodiments, the lower the refresh frequency, the more holding frames may be in the same screen refresh period T, that is, the larger the N. Conversely, the higher the refresh frequency, the smaller the number of holding frames FH in the same screen refresh period T, that is, the smaller the N. When the refresh frequency is not less than the set threshold, for example, when the refresh frequency is not less than 120 Hz, N may be 0, that is, the number of holding frames FH in the screen refresh period T may be 0.

In high frequency display, the refresh frequency may be relatively high. For example, the high frequency refresh mode may be set when the refresh frequency is greater than or equal to 120 Hz. At this time, there may be multiple refresh frames FR and no holding frame FH in a unit time. In this refresh mode, the same reset signal $V_{reset}$ may be used for each refresh frame FR in the same screen refresh period T.

In low frequency display, the refresh frequency may be relatively low. For example, the low frequency refresh mode may be set when the refresh frequency is less than 120 Hz. At this time, in a screen refresh period T, there may be at least one holding frame FH after the refresh frame FR, and the refresh frame FR and the holding frame FH may correspond to different reset signals $V_{reset}$.

FIG. 21 is a schematic structural diagram of another pixel circuit according to some embodiments of the present disclosure. As shown in FIG. 21, the pixel circuit 101 includes a driving transistor M3, the gate of the driving transistor M3 being connected to the first node N1, the first electrode of the driving transistor M3 being connected to the second node N2, and the second electrode of the driving transistor M3 being connected to the third node N3; a compensation transistor M4, the gate of the compensation transistor M4 being used to input the first scan signal S2N, the first electrode of the compensation transistor M4 being connected to the first node N1, and the second electrode of the compensation transistor M4 being connected to the third node N3; and a first reset transistor M7, the gate of the first reset transistor M7 being used to input the first control signal S1, the first electrode of the first reset transistor M7 being used to connect the first electrode of the light-emitting element, and the second electrode of the first reset transistor M7 being used to input the reset signal $V_{reset}$.

In the embodiment shown in FIG. 21, the pixel circuit 101 may perform refresh frequency control through the first scan signal S2N, and perform voltage reset control on the first electrode of the light-emitting element through the first control signal S1.

In the embodiments of the present disclosure, the pixel circuit 101 may include at least a driving transistor M3, a compensation transistor M4, and a first reset transistor M7. The implementation of the pixel circuit 101 may be set based on requirements. For example, the pixel circuit 101 may be a 6T1C pixel circuit structure with six transistors and one storage capacitor, a 7T1C pixel circuit structure with seven transistors and one storage capacitor, or a 8T1C pixel circuit structure with eight transistors and one storage capacitor. The present disclosure does not specifically limit the implementation of the pixel circuit 101, which can be set based on actual needs.

Figure 22:
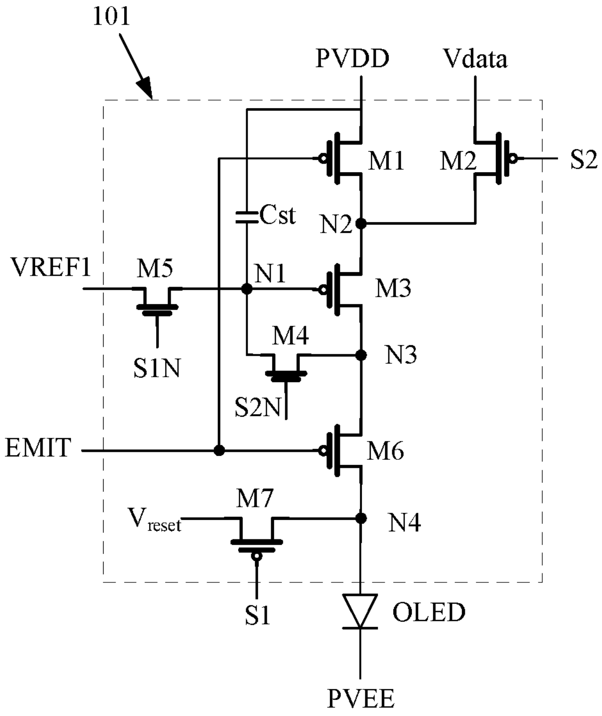
FIG. 22 is a schematic structural diagram of another pixel circuit according to some embodiments of the present disclosure.

FIG. 22 is a schematic structural diagram of another pixel circuit according to some embodiments of the present disclosure. The pixel circuit 101 shown in FIG. 22 is a 7T1C pixel circuit, and the pixel circuit 101 includes a driving transistor M3, a first control transistor M1, a data transistor M2, a compensation transistor M4, a second reset transistor M5, a second control transistor M6, a first reset transistor M7, and a storage capacitor Cst. The gate of the driving transistor M3 is connected to the first node N1, the first electrode of the driving transistor M3 is connected to the second node N2, and the second electrode of the driving transistor M3 is connected to the third node N3. The gate of the first control transistor M1 is connected to the light-emitting control signal EMIT, the first electrode of the first control transistor M1 is connected to the positive DC power supply PVDD, and the second electrode of the first control transistor M1 is connected to the first node N1. The gate of the data transistor M2 is connected to a second control signal S2, the first electrode of the data transistor M2 is connected to the data signal Vdata, and the second electrode of the data transistor M2 is connected to the second node N2. The gate of the compensation transistor M4 is connected to the first scan signal S2N, the first electrode of the compensation transistor M4 is connected to the first node N1, and the second electrode of the compensation transistor M4 is connected to the third node N3. The gate of the second reset transistor M5 is connected to a second scan signal S1N, the first electrode of the second reset transistor M5 is connected to a reference voltage Vref1, and the second electrode of second reset transistor M5 is connected to the first node N1. The gate of the second control transistor M6 is connected to the light-emitting control signal EMIT, the first electrode of the second control transistor M6 is connected to the third node N3, and the second electrode of the second control transistor M6 is connected to a fourth node N4, the fourth node N4 being used to connect the first electrode of the light-emitting element. The gate of the first reset transistor M7 is connected to the first control signal S1, the first electrode of the first reset transistor M7 is connected to the reset signal $V_{reset}$, and the second electrode of the first reset transistor M7 is connected to the fourth node N4. The storage capacitor Cst is connected between the first node N1 and the first electrode of the first control transistor M1.

In the pixel circuit shown in FIG. 22, the first electrode of the first reset transistor M7 is connected to the reset signal $V_{reset}$ related to the refresh frequency of the pixel circuit 101. At least two refresh frequencies may correspond to different reset signals $V_{reset}$ which, when compared with the technical solution of using the same reset signal $V_{reset}$ at all refresh frequencies, can avoid the flickering and unevenness of the display screen.

In order to simplify the display driving sequence, the reference voltage Vref1 may be set to be the same as the reset signal $V_{reset}$ connected to the first electrode of the first reset transistor M7 when the pixel circuit 101 refreshes the refresh frame FR. It should be noted that the reference voltage Vref1 may also be different from the reset signal $V_{reset}$ connected to the first electrode of the first reset transistor M7 when the pixel circuit 101 refreshes the refresh frame FR. In other words, in some embodiments of the present disclosure, the reset signal may be Vref1. That is, the reset signal may be a signal for resetting the gate of the driving transistor. Of course, in other embodiments of the present disclosure, the reset signal may be a reset signal that provides signal reset for any node in the pixel circuit.

Figure 23:
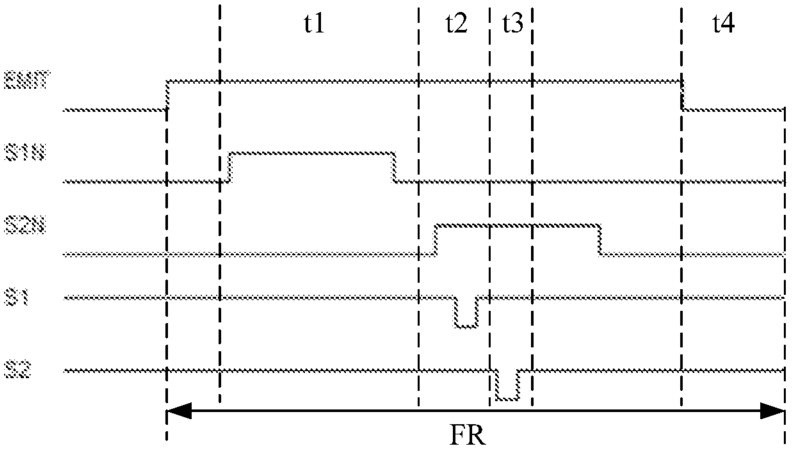
FIG. 23 is a timing diagram of a refresh frame according to some embodiments of the present disclosure.

FIG. 23 is a timing diagram of a refresh frame according to some embodiments of the present disclosure. In particular, the refresh frame FR includes a first time period t1 to a fourth time period t4 according to the time sequence.

In the first time period t1 of the refresh frame FR, the second scan signal S1N is turned on, and the voltage of the first node N1 is reset by the reference voltage Vref1. In the second time period t2 of the refresh frame FR, the first control signal S1 is turned on, the voltage of the first electrode is reset by the reset signal $V_{reset}$, and the first scan signal S2N is turned on. In this way, the first node N1 and the third node N3 can be turned on, such that the driving transistor M3 can be reverse biased, thereby avoiding the hysteresis caused by the driving transistor M3 being turned on for a long time. In the third time period t3 of the refresh frame FR, the first scan signal S2N is kept on, the second control signal is turned on, and the data signal Vdata is written to the first node N1. In the fourth time period t4 of the refresh frame FR, the light-emitting control signal EMIT is turned on, such that the driving transistor M3 and the light-emitting element can be turned on, and the light-emitting element can be controlled to emit light.

In the refresh frame FR, five gate control signals may be needed to control the switching of the pixel circuit 101. The five gate control signals may include the first control signal S1, the second control signal S2, the first scan signal S2N, the second scan signal S1N, and the light emitting control signal EMIT. The gate control signals being turned on may indicate that the gate control signal is at a high level for NMOS, and the gate control signal is at a low level for PMOS.

The timing diagram shown in FIG. 23 is for the pixel circuit shown in FIG. 22. The first control transistor M1, the data transistor M2, the driving transistor M3, the second control transistor M6, and the first reset transistor M7 may all be PMOS, which may be turned off when the gate is input with a high level, and turned on when the gate is input with a low level. The compensation transistor M4 and the second reset transistor M5 may both be NMOS, which may be turned on when the gate is input with a high level, and turned off when the gate is input with a low level.

Combined with the timing diagram shown in FIG. 23, the working process of the pixel circuit 101 shown in FIG. 22 may be as follows.

In the first time period t1 of the refresh frame FR, the second scan signal S1N is tuned on, that is, the second scan signal S1N is at a high level, such that the second reset transistor M5 can be turned on. The reference voltage Vref1 is written to the first node N1, and the voltage of the first node N1 is reset by the reference voltage Vref1.

In the second time period t2 of the refresh frame FR, the first control signal S1 is turned on, that is, the first control signal S1 is at a low level, such that the first reset transistor M7 can be turned on. The reset signal $V_{reset}$ is written to the fourth node N4, and the voltage of the first electrode can be reset through the reset signal $V_{reset}$. During this time period, the first scan signal S2N is also turned on, that is, the first scan signal S2N is at a high level, such that the compensation transistor M4 can be turned on for the driving transistor M3 to be reverse biased.

In the third time period t3 of the refresh frame FR, the first scan signal S2N is kept on, such that the compensation transistor M4 can be kept on, and the second control signal can be turned on. That is, the second control signal S2 is at a low level, such that the data transistor M2 can be turned on. The data signal Vdata is written to the second node N2, and based on the turned-on compensation transistor M4, the data signal Vdata is written to the first node N1.

In the fourth time period t4 of the refresh frame FR, the light-emitting control signal EMIT is turned on, that is, the light-emitting control signal EMIT is switched from a high level to a low level, such that the first control transistor M1 and the second control transistor M6 can be turned on, such that the driving transistor M3 and the light-emitting element can be turned on to provide a driving current for the light-emitting element to control the light-emitting element to emit light through the driving current.

Figure 24:
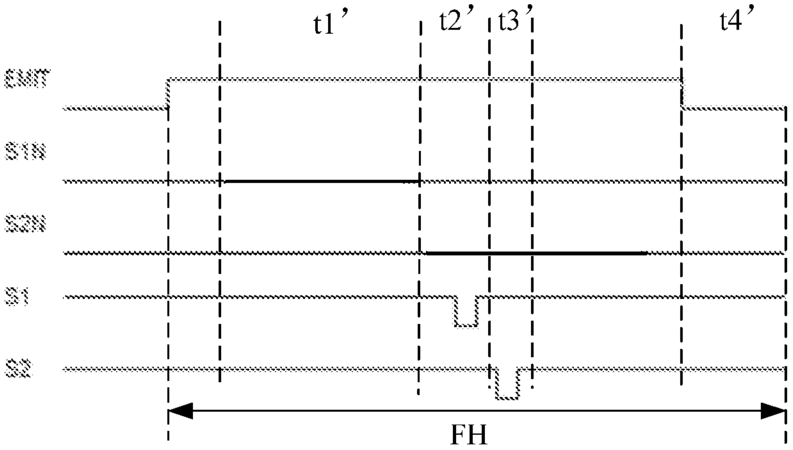
FIG. 24 is a timing diagram of a holding frame according to some embodiments of the present disclosure.

FIG. 24 is a timing diagram of a holding frame according to some embodiments of the present disclosure. The holding frame FH includes a first time period t1' to a fourth time period t4' according to the timing diagram.

The method of controlling the light-emitting element in the holding frame FH may be as follows.

In the first time period t1' of the holding frame FH, the second scan signal S1N is turned off, such that the reference voltage Vref1 and the first node N1 are disconnected.

In the second time period t2' of the holding frame FH, the first control signal S1 is tuned on, and the voltage of the first electrode is reset by the reset signal $V_{reset}$.

In the third time period t3' of the holding frame FH, the second control signal S2 is turned on, and the data signal Vdata is written into the second node N2.

In the fourth time period t4' of the holding frame FH, the light-emitting control signal EMIT is turned on, such that the driving transistor M3 and the light-emitting element can be turned on, and the light-emitting element can be controlled to emit light.

In some embodiments, in the holding frame FH, the first scan signal S2N and the second control signal S1N may be continuously turned off to maintain the potential of the first node N1, thereby prevent the data signal Vdata from being written into the first node N1, and realizing the display image retention.

Combined with the timing diagram shown in FIG. 24, the working process of the pixel circuit 101 shown in FIG. 22 may be as follows.

In the first time period t1' of the holding frame FH, the second scan signal S1N is tuned off, that is, the second scan signal S1N is at a low level. The second reset transistor M5 is turned on, such that the reference voltage Vref1 and the first node N1 can be disconnected In the second time period t2' of the holding frame FH, the first control signal S1 is turned on, that is, the first control signal S1 is at a low level, such that the first reset transistor M7 can be turned on. The reset signal $V_{reset}$ is written to the fourth node N4, and the voltage of the first electrode can be reset through the reset signal $V_{reset}$. During this time period, the first scan signal S2N is kept off.

In the third time period t3' of the holding frame FH, the second control signal S2 is kept on, that is, the second control signal S2 is at a low level, such that the data transistor M2 can be turned on and the data signal Vdata can be written to the second node N2. During this time period, the first scan signal S2N is kept off to prevent the data signal Vdata from being written to the first node N1.

In the fourth time period t4' of the holding frame FH, the light-emitting control signal EMIT is turned on, that is, the light-emitting control signal EMIT is switched from a high level to a low level, such that the first control transistor M1 and the second control transistor M6 can be turned on. Based on the held potential of the first node, the driving transistor M3 and the light-emitting element can be turned on to control the light-emitting element to emit light.

It should be noted that, in the embodiments of the present disclosure, the turn-on sequence of the fourth node N4 is not limited to the time period t2. Further, the first control signal S1 may be turned on in other time periods before the light-emitting control signal EMIT is turned on achieve the reset effect on the fourth node N4.

In the embodiments of the present disclosure, a screen refresh period T of the display panel may include a refresh frame FR and N holding frames FH located after the refresh frame FR. If N is greater than 0, the reset signal $V_{reset}$ corresponding to the pixel circuit 101 in the holding frame FH and the reset signal $V_{reset}$ corresponding to the pixel circuit 101 in the refresh frame FR may both be set as DC voltages, and the reset signal $V_{reset}$ corresponding to pixel circuit 101 in the holding frame FH may be smaller than the reset signal $V_{reset}$ corresponding to the pixel circuit 101 in the refresh frame FR. Experimental data shows that, for most current models of display panels 100, when the holding frame FH is inserted for low refresh frequency display, using the reset signal $V_{reset}$ smaller than the refresh frame FR for the holding frame FH can effectively reduce the flickering and unevenness of the display screen.

In the embodiments of the present disclosure, under the same refresh frequency, if there is a holding frame FH, the pixel circuit 101 may correspond to the same reset signal $V_{reset}$ in the holding frame FH. In this way, under the same refresh frequency, the same reset signal $V_{reset}$ can be used for the holding frame FH, which facilitates the timing control of the holding frame FH.

Under different refresh frequencies, the reset signal $V_{reset}$ corresponding to the pixel circuit 101 in the holding frame FH may be different. At this time, the same pixel circuit 101 may be at different refresh frequencies in at least two different screen refresh periods T, thereby corresponding to different reset signals $V_{reset}$; or, corresponding to the pixel circuits 101 in different sub-display areas, the pixel circuits 101 may be respectively at different refresh frequencies, thereby corresponding to different reset signals $V_{reset}$ respectively. In this way, suitable reset signals $V_{reset}$ can be respectively set under different refresh frequencies, thereby avoiding the flickering and unevenness of the display screen.

Under different refresh frequencies, when the pixel circuit 101 has different reset signals $V_{reset}$ corresponding to the holding frame FH, the reset signal $V_{reset}$ corresponding to the pixel circuit 101 in the holding frame FH can be set to be positively related to the current refresh frequency. Experimental data shows that, for most current models of display panels 100, when the holding frame FH is inserted to perform low refresh frequency display, the lower the refresh frequency, the smaller the reset signal $V_{reset}$ is used in the holding frame FH, on the contrary, the higher the refresh frequency, the larger the reset signal $V_{reset}$ is used in the holding frame FH to improve the flickering and unevenness of the display screen. As described above, the reset signal $V_{reset}$ corresponding to the holding frame FH may not exceed the reset signal $V_{reset}$ corresponding to the refresh frame FR.

in the embodiments of the present disclosure, the value of the reset signal $V_{reset}$ may be positively correlated to the refresh frequency. Experimental data shows that, for most current models of display panels 100, the lower the refresh frequency, the smaller the value of the reset signal $V_{reset}$, on the contrary, the higher the refresh frequency, the larger the value of the reset signal $V_{reset}$, which can improve the flickering and unevenness of the display screen.

Based on the foregoing embodiments, an embodiment of the present disclosure further provides an electronic device. The structure of the electronic device is shown in FIG. 25.

Figure 25:
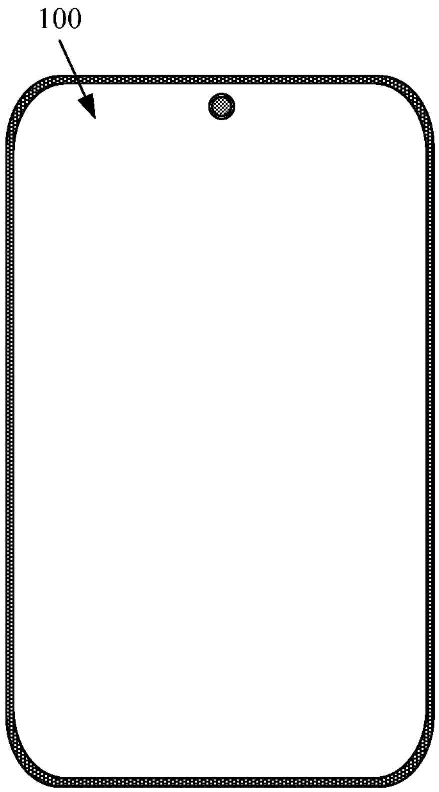
FIG. 25 is a schematic structural diagram of an electronic device according to some embodiments of the present disclosure.

FIG. 25 is a schematic structural diagram of an electronic device according to some embodiments of the present disclosure. The electronic device shown in FIG. 25 can include the display panel 100 described in any one of the foregoing embodiments.

In the embodiments of the present disclosure, the electronic device can be an active light-emitting display panel such as a smart phone, a tablet computer, a notebook computer, a smart wearable device, and a home appliance with a display function. The electronic device can adopt the display panel 100 provided in the foregoing embodiments, such that the reset signal $V_{reset}$ corresponding to the pixel circuit 101 can be adapted to the current refresh frequency, thereby avoiding the flickering and unevenness of the display screen, and improving the image display quality of the electronic device.

Based on the foregoing embodiments, an embodiment of the present disclosure further provides a display driving method. The display driving method may be as shown in FIG. 26.

Figure 26:
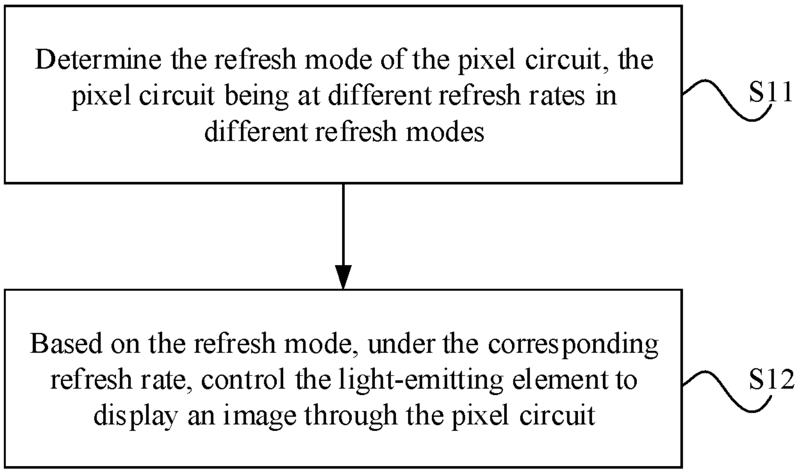
FIG. 26 is a flowchart of a display driving method according to some embodiments of the present disclosure.

FIG. 26 is a flowchart of a display driving method according to some embodiments of the present disclosure. The display driving method can be used for the display panel 100 described in any one of the foregoing embodiments, and can be used for controlling the display panel 100 to perform image display. The method will be described in detail below.

S11, determining the refresh mode of the pixel circuit, the pixel circuit being at different refresh frequencies in different refresh modes.

S12, based on the refresh mode, under the corresponding refresh frequency, controlling the light-emitting element to display an image through the pixel circuit.

In some embodiments, there are at least two different refresh modes, such that the pixel circuit can be at different refresh frequencies, and control the light-emitting element to perform image display based on the input of different reset signals.

The display driving method provided by the embodiments of the present disclosure can be applied to the display panel 100, such that the reset signal $V_{reset}$ corresponding to the pixel circuit 101 can be adapted to the current refresh frequency, thereby avoiding the flickering and unevenness of the display screen, and improving the image display quality of the electronic device.

In some embodiments, in the process at S12 may include controlling the pixel circuit 101 based on the first refresh frequency to input the first reset signal $V_{reset1}$ to the pixel circuit if the pixel circuit 101 is in the first refresh mode; and, controlling the pixel circuit 101 based on the second refresh frequency to input the second reset signal $V_{reset2}$ to the pixel circuit if the pixel circuit 101 is in the second refresh mode.

In the display driving method provided by the embodiments of the present disclosure, for the implementation principle of providing an adapted reset signal $V_{reset}$ for the pixel circuit 101 based on the refresh frequency, reference can be made to the relevant description in the foregoing embodiments, and details will not be repeated here.

Embodiments in this specification are described in a progressive, a parallel, or a combination of progressive and parallel manner. Each embodiment focuses differently from other embodiments. The same and similar parts between the embodiments refer to each other. For the embodiments provided spatial light modulator, the holographic 3D display apparatus, and the driving method of the holographic 3D display apparatus, since the liquid crystal module corresponds to the spatial light modulator disclosed in the embodiments, the description is relatively simple, and the relevant parts are made referred to the description corresponding to the liquid crystal module.

It should be noted that, in the description of the present disclosure, the accompanying drawings and descriptions of the embodiments are intended to be illustrative and not restrictive. The same reference numerals can identity the same structures throughout the embodiments of the present disclosure. In addition, the drawings may exaggerate the thickness of some layers, films, panels, regions, etc., for the sake of understanding and ease of description. It will be understood that when an element such as a layer, film, region, or substrate is referred to as being "on" another element, it can be directly on the other element or intervening elements may also be present. Further, throughout the specification, the word "on" means positioning on or below the object portion, but does not essentially mean positioning on the upper side of the object portion based on a gravity direction.

In the description of the present disclosure, the terms of "upper," "lower," "top," "bottom," "inner," "outer," etc., indicate the orientation or positional relationship based on the drawings, which are only for the convenience of describing the present disclosure and simplifying the description, rather than indicating or implying that the device or element referred to must have a specific orientation, or be constructed and operated in a specific orientation. Thus, the terms cannot be considered to limit the present disclosure. When a component is considered to be "connected" to another component, the component may be directly connected to another component, or a center component may exist at the same time.

In the present disclosure, relational terms such as first and second are only used to distinguish one entity or operation from another entity or operation, and do not necessarily require or imply these entities or operations having any such actual relationship or order among them. The terms "including," "containing," or any other variations thereof are intended to encompass non-exclusive inclusion, such that an item or device that includes a series of elements includes not only those elements, but also other elements that are not explicitly listed, or may include elements inherent to such an item or device. Without more restrictions, the elements defined by the sentence "include a . . . " do not exclude the existence of other identical elements in the item or device, which include the above elements.

The above description of the disclosed embodiments enables those skilled in the art to implement or use the present disclosure. Various modifications to these embodiments will be apparent to those skilled in the art. The general principles defined herein may be implemented in other embodiments without departing from the spirit or scope of the disclosure. Therefore, the present disclosure will not be limited to the embodiments shown in the present specification but shall conform to the widest scope consistent with the principles and novel features disclosed in the present specification.

What is claimed is:

1. A display panel comprising:

a pixel circuit, the pixel circuit including a plurality of refresh modes; and at least two different refresh modes for the pixel circuit to be at different refresh frequencies, different refresh frequencies corresponding to different reset signals, wherein the display panel includes N holding frames in a first screen refresh period, and M holding frames in a second screen refresh period, M and N being unequal natural numbers;

the pixel circuit corresponds to different reset signals during the first screen refresh period and the second screen refresh period;

the same screen refresh period has a refresh frame and a plurality of holding frames after the refresh frame; and in the same screen refresh period, the reset signal corresponding to the pixel circuit in the plurality of holding frames is different from the reset signal corresponding to the refresh frame.

2. The display panel of claim 1, wherein:

the display panel includes at least a first sub-display area and a second sub-display area, the first sub-display area the second sub-display area do not overlap;

at a given time, the first sub-display area and the second sub-display area are at different refresh frequencies.

3. The display panel of claim 2, wherein:

the pixel circuit includes at least a first refresh mode and a second refresh mode;

in the first sub-display area, the pixel circuit is at a first refresh frequency in the first refresh mode, corresponding to a first reset signal; and in the second sub-display area, the pixel circuit is at a second refresh frequency, in the second refresh mode, corresponding to a second reset signal, the first refresh frequency being different from the second refresh frequency, the first reset signal being different from the second reset signal.

4. The display panel of claim 1, wherein:

the display panel includes at least a first sub-display area; and in the first sub-display area, the pixel circuit corresponds to different reset signals in the first screen refresh period and the second screen refresh period.

5. The display panel of claim 4, wherein:

there is a third screen refresh period that does not overlap with the first screen refresh period and the second screen refresh period, the first screen refresh period, the second screen refresh period, and the screen refresh period respectively corresponding to different refresh modes; and in the first sub-display area, the pixel circuit is respectively at different refresh frequencies in the first screen refresh period, the second screen refresh period, and the screen refresh period, and corresponds to set reset signals respectively.

6. The display panel of claim 1, wherein:

in the same screen refresh period, the reset signals corresponding to the pixel circuit in the holding frames are all the same.

7. The display panel of claim 1, wherein:

in the same screen refresh period, the reset signals corresponding to the pixel circuit in at least two of the holding frames are different, and neither is equal to the reset signals corresponding to the refresh frame.

8. The display panel of claim 7, wherein:
in the same screen refresh period, for any two of the holding frames, the reset signal corresponding to a latter holding frame is smaller than the reset signal corresponding to a previous holding frame.

9. The display panel of claim 1, wherein:
in the same screen refresh period, the reset signal corresponding to at least one of the holding frame is the same as the reset signal corresponding to the refresh frame.

10. The display panel of claim 1, wherein:
the pixel circuit includes:
a driving transistor, a gate of the driving transistor being connected to a first node, a first electrode of the driving transistor being connected to a second node, a second electrode of the driving transistor being connected to a third node;
a compensation transistor, a gate of the compensation transistor being used to access a first scan signal, a first electrode of the compensation transistor being connected to the first node, a second electrode of the compensation transistor being connected to the third node, the refresh frequency of the pixel circuit being a switching frequency of the first scan signal.

11. The display panel of claim 1, wherein:
the pixel circuit includes at least a first refresh mode and a second refresh mode;
in the first refresh mode, the pixel circuit is at the first refresh frequency, and before a light-emitting element is controlled to emit light, a first electrode of the light-emitting element is reset by an input first reset signal;
in the second refresh mode, the pixel circuit is at the second refresh frequency, and before the light-emitting element is controlled to emit light, the first electrode of the light-emitting element is reset by the input second reset signal, the first reset signal being different from the second reset signal.

12. The display panel of claim 1, wherein:
the pixel circuit includes a first reset transistor, a gate of the first reset transistor being used to electrically connect a first control signal, a first electrode of the first reset transistor being connected to the first electrode of the light-emitting element, a second electrode of the first reset transistor being used to electrically connect the reset signal.

13. The display panel of claim 1, wherein:
one screen refresh period of the display panel includes a refresh frame and N holding frames located after the refresh frame, N being a natural number related to the refresh frequency;
if N is greater than 0, the holding frame includes a light-emitting phase; and
the refresh frame includes a data writing phase and the light-emitting phase, the data writing phase including writing of data signals.

14. The display panel of claim 1, wherein:
one screen refresh period of the display panel includes a refresh frame and N holding frames located after the refresh frame, N being a natural number related to the refresh frequency; and
if N is greater than 0, the reset signal corresponding to the pixel circuit in the holding frame is less than or equal to the reset signal corresponding to the refresh frame, and the reset signal corresponding to the pixel circuit in at least one of the holding frames is different from the reset signal corresponding to the refresh frame.

15. The display panel of claim 14, wherein:
the pixel circuit includes:
a driving transistor, a gate of the driving transistor being connected to a first node, a first electrode of the driving transistor being connected to a second node, a second electrode of the driving transistor being connected to a third node;
a compensation transistor, a gate of the compensation transistor being used for inputting a first scan signal, a first electrode of the compensation transistor being connected to the first node, a second electrode of the compensation transistor being connected to the third node; and
a first reset transistor, a gate of the first reset transistor being used for receiving a first control signal, a first electrode of the first reset transistor being connected to the first electrode of the light-emitting element, a second electrode of the first reset transistor being used for inputting the reset signal.

16. The display panel of claim 15, wherein:
the refresh frame includes a first refresh frame time period, a second refresh frame time period, a third refresh frame time period, and a fourth refresh frame time period;
in the first refresh frame time period, a second scan signal is turned, and a first node voltage is reset by a reference voltage;
in the second refresh frame time period, the first control signal is turned on, a first electrode voltage is reset by the reset signal, and the first scan signal is turned on to turn on the first node and the third node to perform threshold compensation on the driving transistor;
in the third refresh frame time period, the first scan signal is kept on, a second control signal is turned on, and a data signal is written to the first node; and
in the fourth refresh frame time period, a light-emitting control signal is turned on to turn on the driving transistor and the light-emitting element to control the light-emitting element to emit light.

17. The display panel of claim 15, wherein:
the holding frame includes a first holding frame time period, a second holding frame time period, a third holding frame time period, and a fourth holding frame time period;
controlling the light-emitting element in the holding frame includes:
in the first holding frame time period, turning off the second scan signal to disconnect the reference voltage from the first node;
in the second holding frame time period, turning on the first control signal, and resetting the first electrode voltage through the reset signal;
in the third holding frame time period, turning on the second signal, and writing the data signal into the second node; and
in the fourth holding frame time period, turning on the light-emitting control signal to turn on the driving transistor and the light-emitting element to control the light-emitting element to emit light, the first scan signal and the second scan signal being continuously turned off in the holding frame.

18. The display panel of claim 14, wherein:
if N is greater than 0, the reset signal corresponding to the pixel circuit in the holding frame and the reset signal corresponding to the refresh frame are both DC voltages, and the reset signal corresponding to the pixel circuit in the holding frame is smaller than the reset signal corresponding to the refresh frame.

19. The display panel of claim 14, wherein:

under the same refresh frequency, if there is a holding frame, the pixel circuits correspond to the same reset signal in the holding frame; and under different refresh frequencies, the reset signals corresponding to the pixel circuit in the holding frame are different.

20. The display panel of claim 19, wherein:

the reset signal corresponding to the pixel circuit in the holding frame is positively correlated with the refresh frequency of the pixel circuit.

21. The display panel of claim 1, wherein:

a value of the reset signal is positively correlated to the refresh frequency.

22. An electronic device comprising:

a display panel, the display panel including:

a pixel circuit, the pixel circuit including a plurality of refresh modes; and at least two different refresh modes for the pixel circuit to be at different refresh frequencies, different refresh frequencies corresponding to different reset signals, wherein the display panel includes N holding frames in a first screen refresh period, and M holding frames in a second screen refresh period, M and N being unequal natural numbers;

the pixel circuit corresponds to different reset signals during the first screen refresh period and the second screen refresh period;

the same screen refresh period has a refresh frame and a plurality of holding frames after the refresh frame; and in the same screen refresh period, the reset signal corresponding to the pixel circuit in the plurality of holding frames is different from the reset signal corresponding to the refresh frame.

23. A display panel display driving method comprising:

determining a refresh mode of a pixel circuit, the pixel circuit being at different refresh frequencies in different refresh modes;

based on the refresh mode, under a corresponding refresh frequency, controlling, by the pixel circuit, a light-emitting element to perform image display, wherein:

there are at least two different refresh modes for the pixel circuit to be at different refresh frequencies, and the light-emitting element is controlled to display images based on different input reset signals, wherein the display panel includes N holding frames in a first screen refresh period, and M holding frames in a second screen refresh period, M and N being unequal natural numbers;

the pixel circuit corresponds to different reset signals during the first screen refresh period and the second screen refresh period;

the same screen refresh period has a refresh frame and a plurality of holding frames after the refresh frame; and in the same screen refresh period, the reset signal corresponding to the pixel circuit in the plurality of holding frames is different from the reset signal corresponding to the refresh frame.

24. The display driving method of claim 23, wherein, based on the refresh mode, under the corresponding refresh frequency, controlling the light-emitting element to perform image display through the pixel circuit, includes:

in response to the pixel circuit being in a first refresh mode, controlling the pixel circuit based on a first refresh frequency to input a first reset signal to the pixel circuit; and in response to the pixel circuit being in a second refresh mode, controlling the pixel circuit based on a second refresh frequency to input a second reset signal to the pixel circuit.

* * * * *